(12) United States Patent
White

(10) Patent No.: US 12,418,164 B2
(45) Date of Patent: Sep. 16, 2025

(54) NON-WELDED VERTICAL CABLE TRAY REDIRECTOR

(71) Applicant: James C. White Company, Inc., Greenville, SC (US)

(72) Inventor: Thomas C. White, Greenville, SC (US)

(73) Assignee: James C. White Company, Inc., Greenville, SC (US)

( * ) Notice: Subject to any disclaimer, the term of this patent is extended or adjusted under 35 U.S.C. 154(b) by 0 days.

(21) Appl. No.: 18/522,747

(22) Filed: Nov. 29, 2023

(65) Prior Publication Data

US 2024/0106213 A1  Mar. 28, 2024

Related U.S. Application Data

(63) Continuation-in-part of application No. 17/498,924, filed on Oct. 12, 2021, now Pat. No. 11,936,172,
(Continued)

(51) Int. Cl.
*H02G 3/04* (2006.01)
*F16L 3/26* (2006.01)
*G02B 6/44* (2006.01)

(52) U.S. Cl.
CPC .............. *H02G 3/0456* (2013.01); *F16L 3/26* (2013.01); *G02B 6/4453* (2013.01)

(58) Field of Classification Search
CPC ........ H02G 3/0456; F16L 3/26; G02B 6/4453
See application file for complete search history.

(56) References Cited

U.S. PATENT DOCUMENTS

| 5,469,893 A | 11/1995 | Caveney et al. |
| 8,167,250 B2 * | 5/2012 | White .................. H02G 3/0608 |
| | | 248/68.1 |

(Continued)

FOREIGN PATENT DOCUMENTS

| CN | 208433706 U | 1/2019 |
| DE | 102017120728 A1 | 3/2019 |

(Continued)

OTHER PUBLICATIONS

James White Tubetrack 2017 product catalog, https://fwwebbimage.fwwebb.com/ProductInfo/tubetrack_online.pdf (Year: 2017).*
(Continued)

*Primary Examiner* — Terrell L McKinnon
*Assistant Examiner* — Ding Y Tan
(74) *Attorney, Agent, or Firm* — Seth L. Hudson; Maynard Nexsen PC

(57) ABSTRACT

Vertical redirector components speed assembly and connection of cable trays. More efficiently manufactured, universal components needed throughout vertical redirectors of a specific size and type cable tray run reduce the overall total items and cost of inventory. The improvement is in part the elimination of welding cable redirector components in favor of connecting the components together with bolts and nuts in the field. The inventory and shipment of individual parts is substantially more efficient because the new components "nest" efficiently prior to assembly. Moreover, components are designed to minimize the number of bolts and nuts used without jeopardizing strength. The use of bolts and nuts to fasten the components also enables good electrical conductivity for effective electrical grounding of the assembled cable tray system.

20 Claims, 24 Drawing Sheets

Related U.S. Application Data which is a continuation of application No. 16/892,974, filed on Jun. 4, 2020, now Pat. No. 11,171,470.

(56) References Cited

U.S. PATENT DOCUMENTS

| | | | |
|---|---|---|---|
| 9,184,578 | B2 | 11/2015 | Winn et al. |
| 9,841,123 | B1 | 12/2017 | White |
| 11,171,470 | B1 | 11/2021 | White |
| 11,936,172 | B1 | 3/2024 | White |
| 2012/0312761 | A1 | 12/2012 | White |
| 2016/0077299 | A1* | 3/2016 | Tally ............... G02B 6/4459 385/135 |

FOREIGN PATENT DOCUMENTS

| | | | | |
|---|---|---|---|---|
| EP | 1249653 | A1 | 10/2002 | |
| EP | 1249653 | B1 | 1/2004 | |
| EP | 2211436 | A1 * | 7/2010 | ........... H02G 3/0437 |
| FR | 2682311 | A1 | 4/1993 | |
| GB | 2267605 | A * | 12/1993 | ........... H02G 3/0608 |
| GB | 2314216 | A * | 12/1997 | ................ F16L 3/26 |
| GB | 2527600 | B | 10/2019 | |
| PL | 191621 | B1 | 6/2006 | |
| WO | 9307665 | A1 | 4/1993 | |
| WO | 2012127087 | A2 | 9/2012 | |
| WO | WO-2017147256 | A1 * | 8/2017 | ........... H02G 3/0608 |

OTHER PUBLICATIONS

Click and Go youtube video titled "Click and Go!—Instructive #7/ Using Vertical Bend" dated Sep. 17, 2013, https://www.youtube.com/watch?v=kIZCk-IVAU0 (Year: 2013).*

Legrand Cablofil trough tray product catalog dated Jun. 23, 2016 https://legrand.cr/wp-content/uploads/2023/05/cablofil-toughtray-2017-18.pdf (Year: 2016).*

Vergokan snap-in rising elbow SBCL online product page, https://www.vergokan.com/en/cable-support-systems/cable-trays/Accessories/SBCL dated on archive.org at Apr. 14, 2019 (Year: 2019).*

Obo-bettermann vertical 90 degrees ascending RBV sold on amazon.com first available date: Feb. 26, 2015 https://www.amazon.de/-/en/obo-bettermann-Curved-Vertical-Ascending-s-ft/dp/B00B7ZJCT2 (Year: 2015).*

Cable-Race® dedicated tray support system catalog from James C. White Company, Inc, 29 pages, dated Aug. 2019 (Year: 2019).

James White Tubetrack 2017 product catalog for continuous tray support system (Year: 2017).

Techline Mfg. snap track catalog for Aluminum Cable Tray Systems, 76 pages, 2017 (Year: 2017).

* cited by examiner

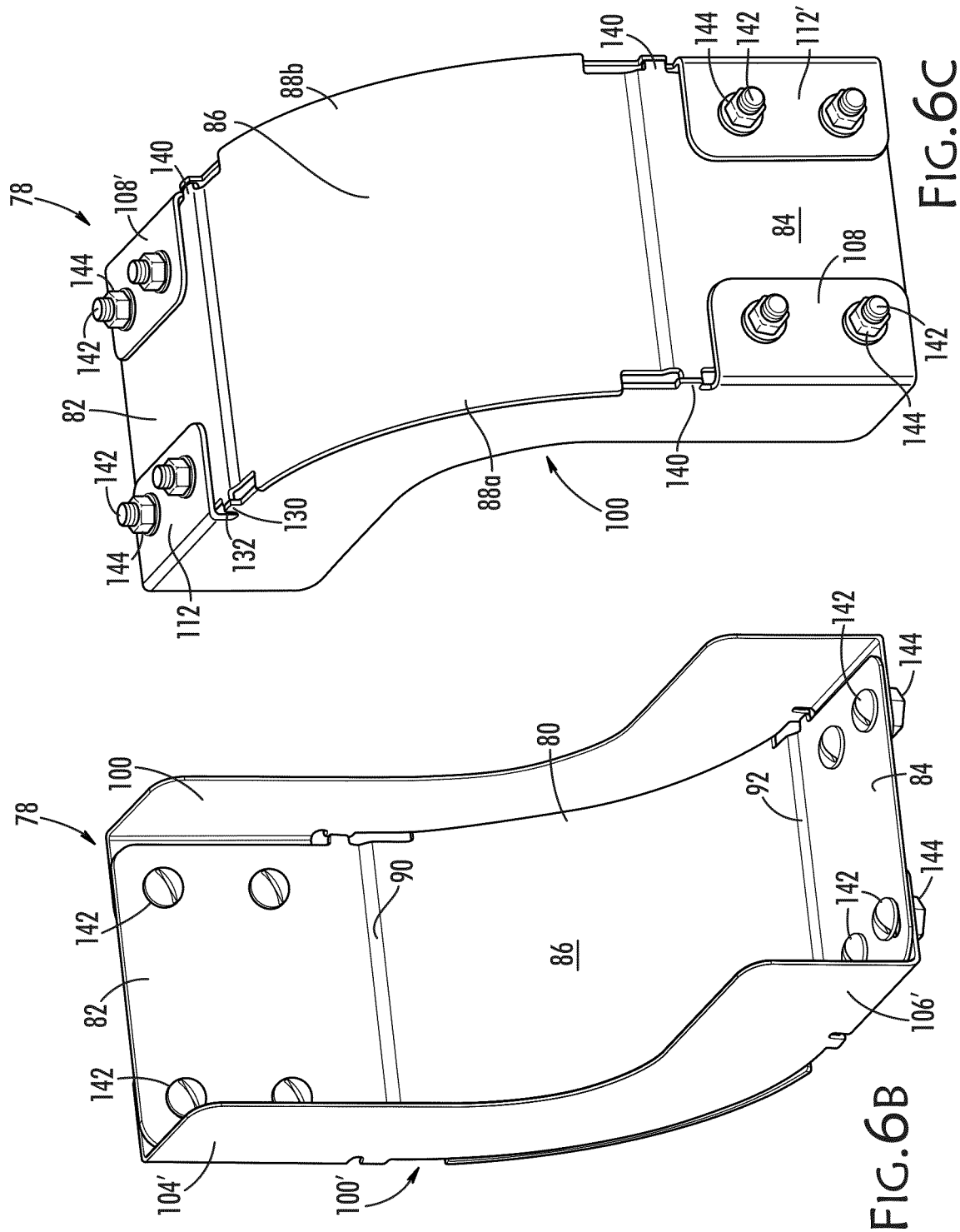

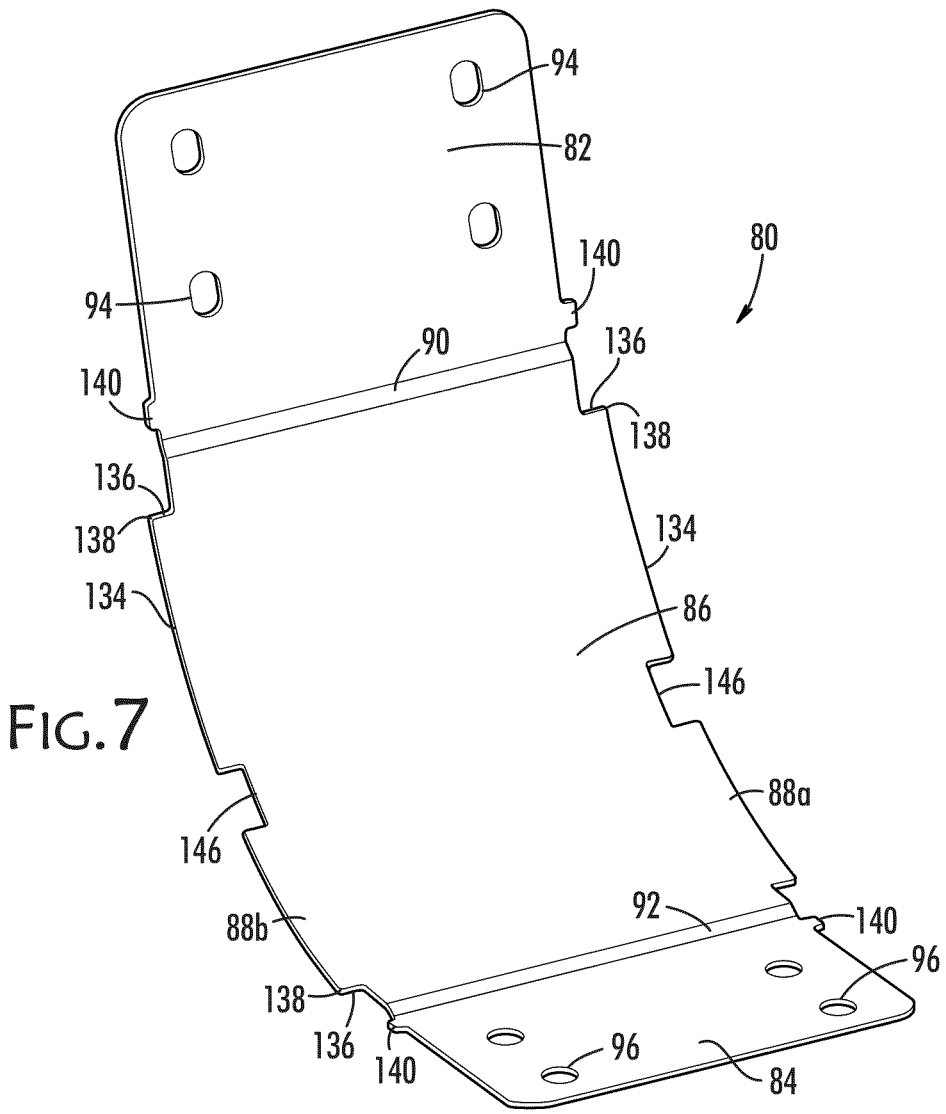

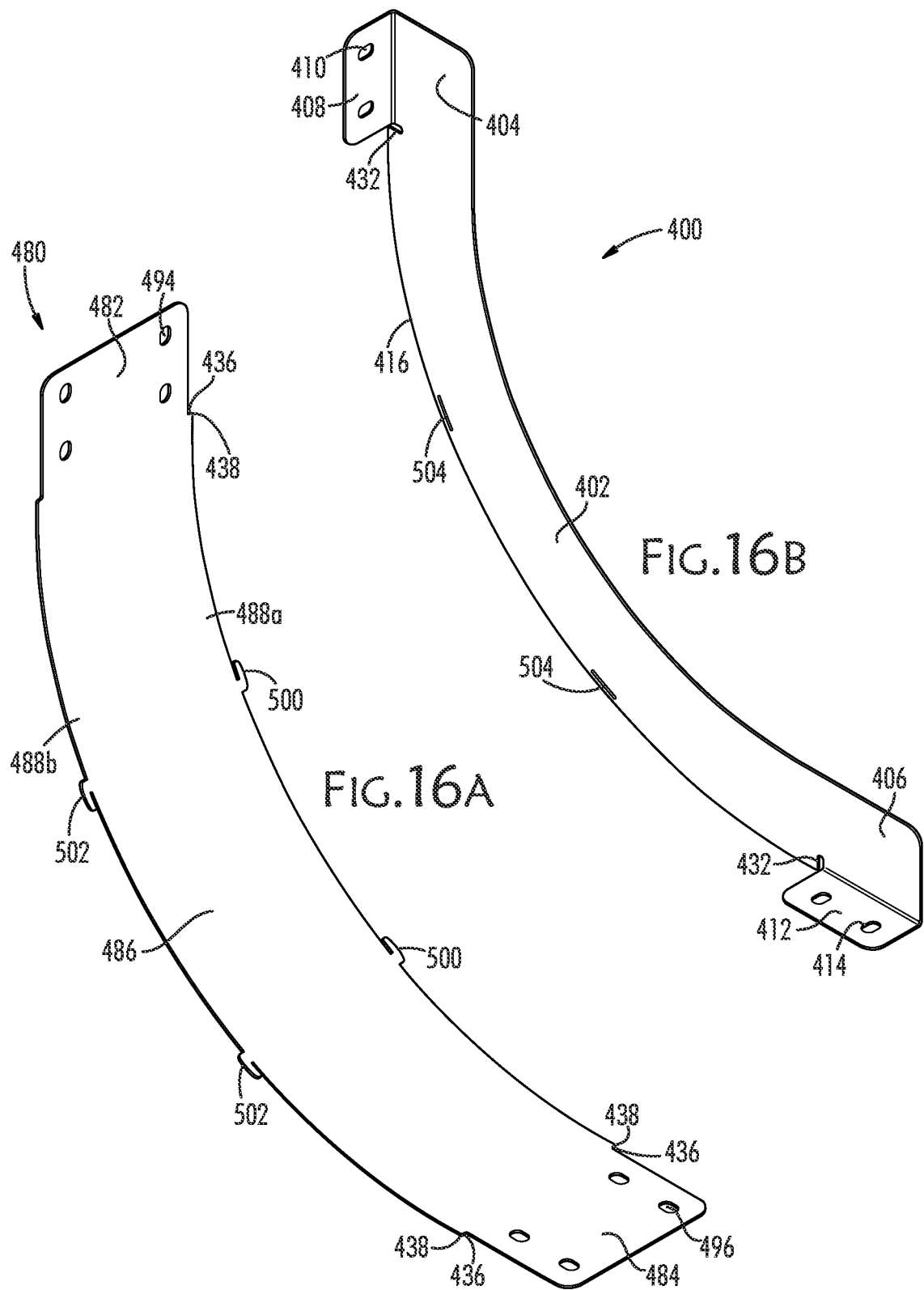

NON-WELDED VERTICAL CABLE TRAY REDIRECTOR

CROSS-REFERENCE TO RELATED APPLICATION

This application is a continuation-in-part application of U.S. patent application Ser. No. 17/498,924, and entitled "A Non-Welded Horizontal Cable Tray Redirector", filed Oct. 12, 2021, which is a continuation application of U.S. Pat. No. 11,171,470, filed Jun. 4, 2020, and entitled "A Non-Welded Horizontal Cable Tray Redirector." Accordingly, this application claims benefit of U.S. Pat. No. 11,171,470 and U.S. patent application Ser. No. 17/498,924 under 35 U.S.C. § 120. U.S. Pat. No. 11,171,470 and U.S. patent application Ser. No. 17/498,924 are incorporated herein in their entirety.

TECHNOLOGY FIELD

This disclosure relates to cable trays in general and, in particular, to components of cable trays that change the direction, or "redirect" a cable tray. An example of a cable tray redirector is found in U.S. Pat. No. 8,573,409, which is incorporated herein in its entirety by reference.

BACKGROUND

Cable trays are devices that support electrical cables. The term "cables" is intended broadly to include fiber optic cables, pipes, conduit, wiring, tubing, and the like, which may deliver electrical and optical signals, electricity, fluids, and data from one location to another. Cable trays can make it easier to install cables, to facilitate the connecting of cables, to locate and trace cables, and to replace, add or remove cables.

Plural cable tray components may be connected together to form runs. The runs are usually elevated so that the cables they carry are out of harm's way, and not an obstruction to people or vehicles and are well above standing water and stored items. It is often easier to install and trace cables when they are in cable tray runs that are overhead than when they are on the ground where they compete for floor space with vehicles, inventory, finished goods, and pedestrian pathways.

In many facilities, such as processing plants that include devices for instrument control and monitoring, cables can be so numerous that several tray runs may be required, some oriented in different directions and at different elevations, perhaps changing direction repeatedly in order to avoid walls, columns and other cable tray runs when proceeding to their various destinations in the facility.

Cable trays thus serve important purposes, particularly in plants requiring highly automated systems for monitoring and control such as, for example, office buildings, factories, warehouses, nuclear facilities, power plants and refineries.

Thus, cable trays and the components used with cable trays need to enable designers to create cable tray runs that can reach their destination without interfering with other structures, and with the ability to change direction as needed in order to get them to where they are intended to go.

A cable tray redirector, or simply a "redirector", as used herein, refers to a component of a cable tray run that changes the direction of the cable tray run in a horizontal plane. A redirector may enable some of the cables in a tray to change direction by 90 degrees, for example, as some cables in the same cable tray run may continue forward in the original direction while others are directed in yet a third direction.

More easily assembled, robust in operation, and economical cable tray redirectors would be an advantage in cable tray system design, construction and use. Better redirectors might have little or no welding requirements, use the same connecting fasteners as are commonly used to connect redirecting connectors to tray sections, and might be made of a metal that could be easily electrically grounded, not be bulky or difficult to store, package and ship, and could be used in a wide variety of cable tray applications.

SUMMARY

According to its major aspects and briefly recited, herein is disclosed a set of components that are used to assemble cable tray redirectors that are useful for redirecting cable tray runs. The components are connected using the same bolts and nuts throughout, and which are used in the present redirector kit to avoid welded joints or expensive manufacturing processes. Welding takes time and may be unsuitable in some facilities, such as nuclear power plants and process facilities or where there are seismic restrictions because of concerns for stress and corrosion. The components of the present redirectors are made of materials that preserve electrical conductivity throughout any cable tray run, which makes electrical grounding easier. Also, the present cable tray redirectors enable cable redirection to the left and to the right, or both, up to 90 degrees in a horizontal plane. In addition, unlike prior art redirectors, the major components of the present system are designed to "nest", which means that one component fits close to another of the same kind so that storage and shipping volumes are greatly reduced, requiring less warehouse, packaging or onsite space to maintain inventory. The fasteners used to assemble components are all interchangeable, too, so minimal numbers of part types need to be maintained.

Current or known cable tray redirectors are fabricated as a weldment or a press formed metal, fiberglass or plastic product. The present redirectors reduce costs by eliminating welding time and excessive costs of press-forming and drawing tools. The present redirector is manufactured and assembled without welding.

A feature of the present disclosure is a redirector that connects mechanically to straight tray sections. The present redirector requires no welding for connection to cable tray sections. The present redirector comprises multiple components, which are assembled using the same fasteners that connect the redirector kit to straight tray sections, using fasteners common to cable tray construction. In fact, the same number and type of fasteners required to connect a prior art welded redirector to cable trays is required for the assembly of the present redirecting kit to cable trays. Welding is eliminated without adding the cost of material and time to assemble the present redirectors to cable trays.

Those skilled in the construction and operation of cable trays and redirectors will appreciate these and other features and their advantages from a careful reading of the Detailed Description, accompanied by the following drawings.

BRIEF DESCRIPTION OF THE DRAWINGS

FIG. 6B shows an assembled, perspective view of the vertical redirector of FIG. 6A with two flange fittings engaged to the vertical redirector base, according to an aspect of the disclosure;

FIG. 6C shows an assembled, back perspective view of the vertical redirector of FIGS. 6A and 6B with two flange fittings engaged to the vertical redirector base, according to an aspect of the disclosure;

FIG. 7 shows a perspective view of a vertical redirector base, according to an aspect of the disclosure;

FIG. 8 shows a perspective view of a vertical redirector flange fitting, according to an aspect of the disclosure;

FIG. 16A is a perspective view of a vertical redirector base, according to an aspect of the disclosure;

FIG. 16B is a perspective view of a flange fitting, according to an aspect of the disclosure;

DETAILED DESCRIPTION

Figure 1:
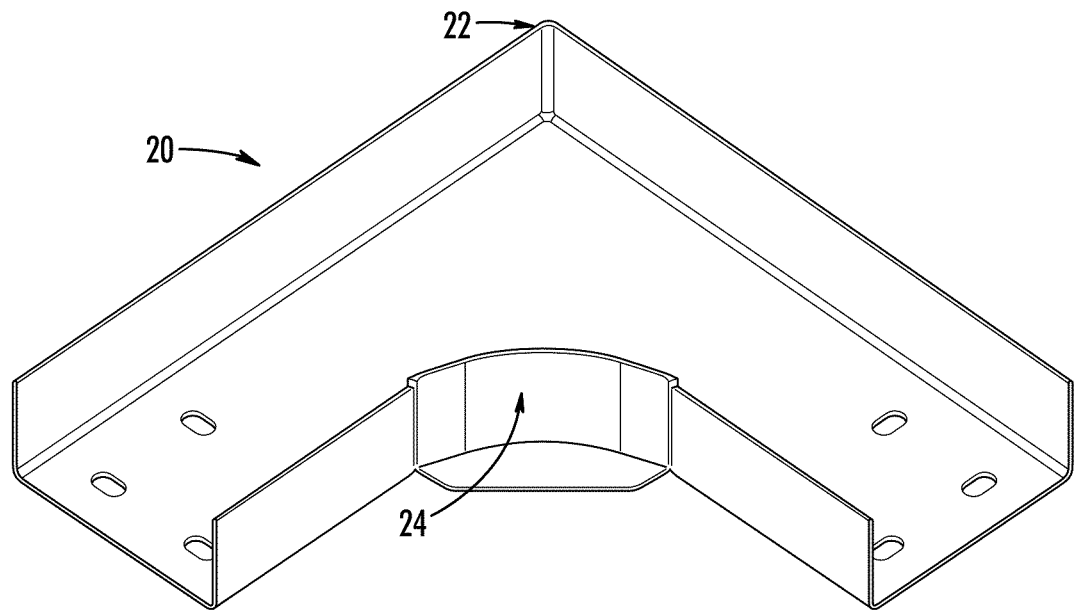
FIG. 1 is a perspective view of a prior art cable tray redirector for redirecting the horizontal course of a cable tray run by 90-degrees.
Figure 2:
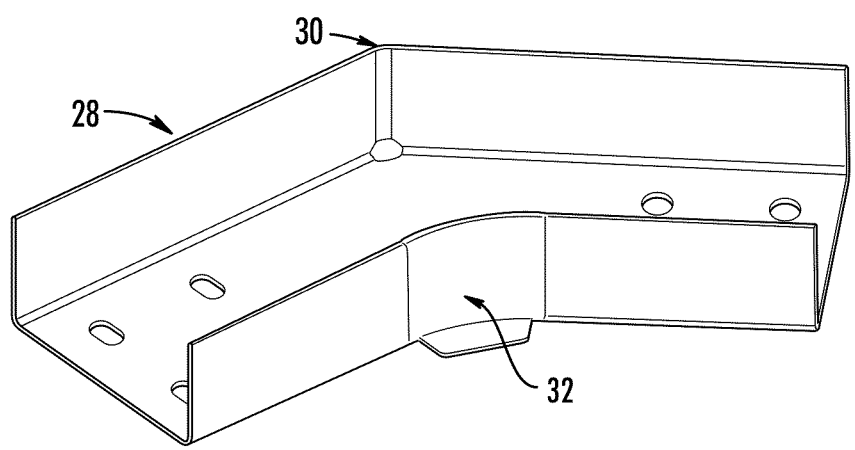
FIG. 2 is a perspective view of another prior art cable tray redirector for redirecting the horizontal course of a cable tray run by 45-degrees.
Figure 3A:
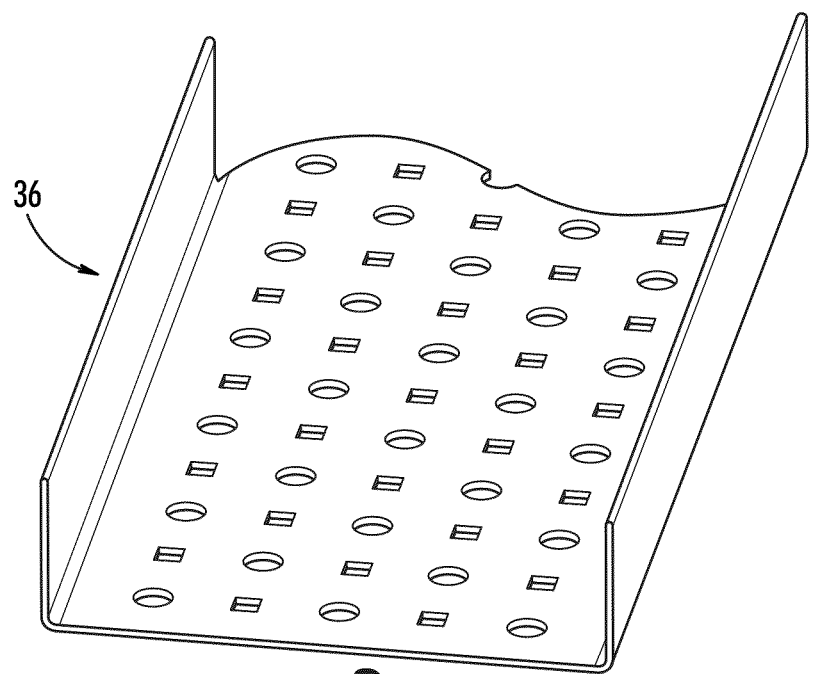
FIGS. 3A, 3B, and 3C, respectively, show perspective views of sections of a wide prior art cable channel tray (FIG. 3A), a narrow prior art cable channel tray (FIG. 3B); and a prior art L-shaped cable tray having one wall (FIG. 3C), wherein each tray has at least one row of holes for mounting clamps and guides to control the cables in the bed of the respective tray and for connecting tray sections and redirectors.
Figure 3B:
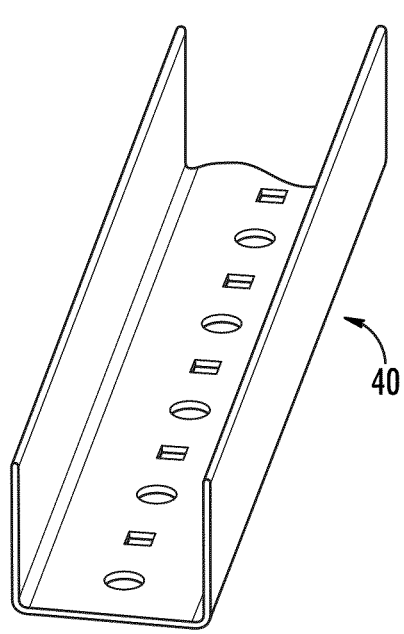
Figure 3C:
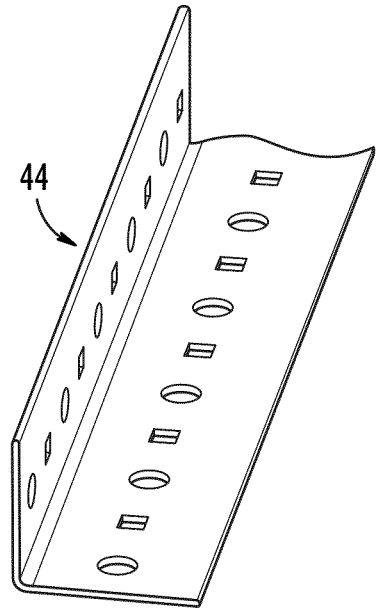

Referring now to the drawings, FIGS. 1 and 2 show two prior art cable tray redirectors, and FIGS. 3A, 3B, and 3C show prior art cable trays that can be attached to the prior art cable tray redirectors of FIGS. 1, 2.

FIG. 1, in particular, shows a redirector 20 with a curved (90-degree arc) wall 24. FIG. 2 shows a redirector 28 with a curved (45-degree arc) wall 32. Both 90-degree redirector 20 and 45-degree redirector 28 have welded corners 22, 30, respectively, and welded inside flanges 24, 32.

Figure 3D:
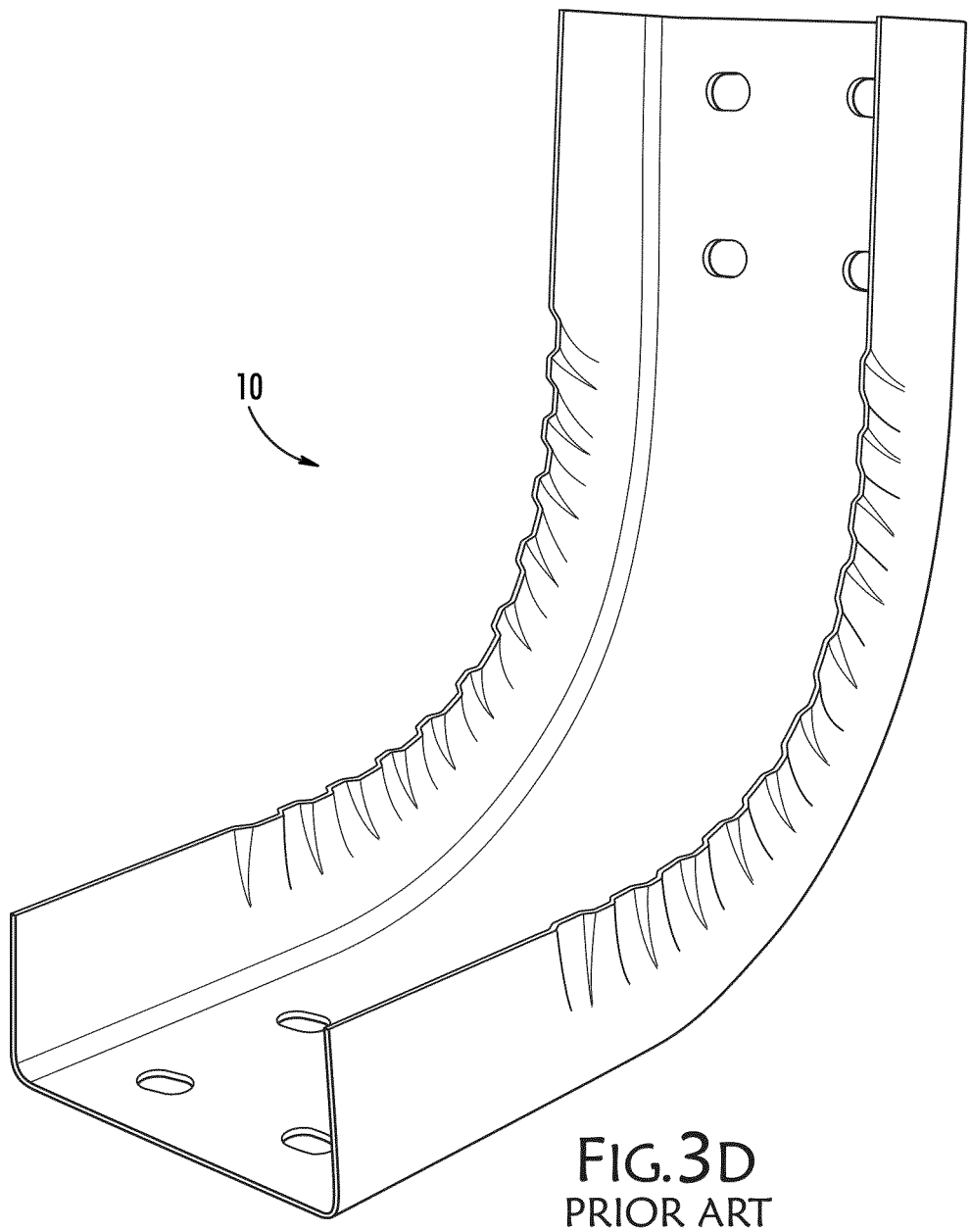
FIG. 3D shows a perspective view of a prior art vertical tray redirector that is press formed into shape.
Figure 3E:
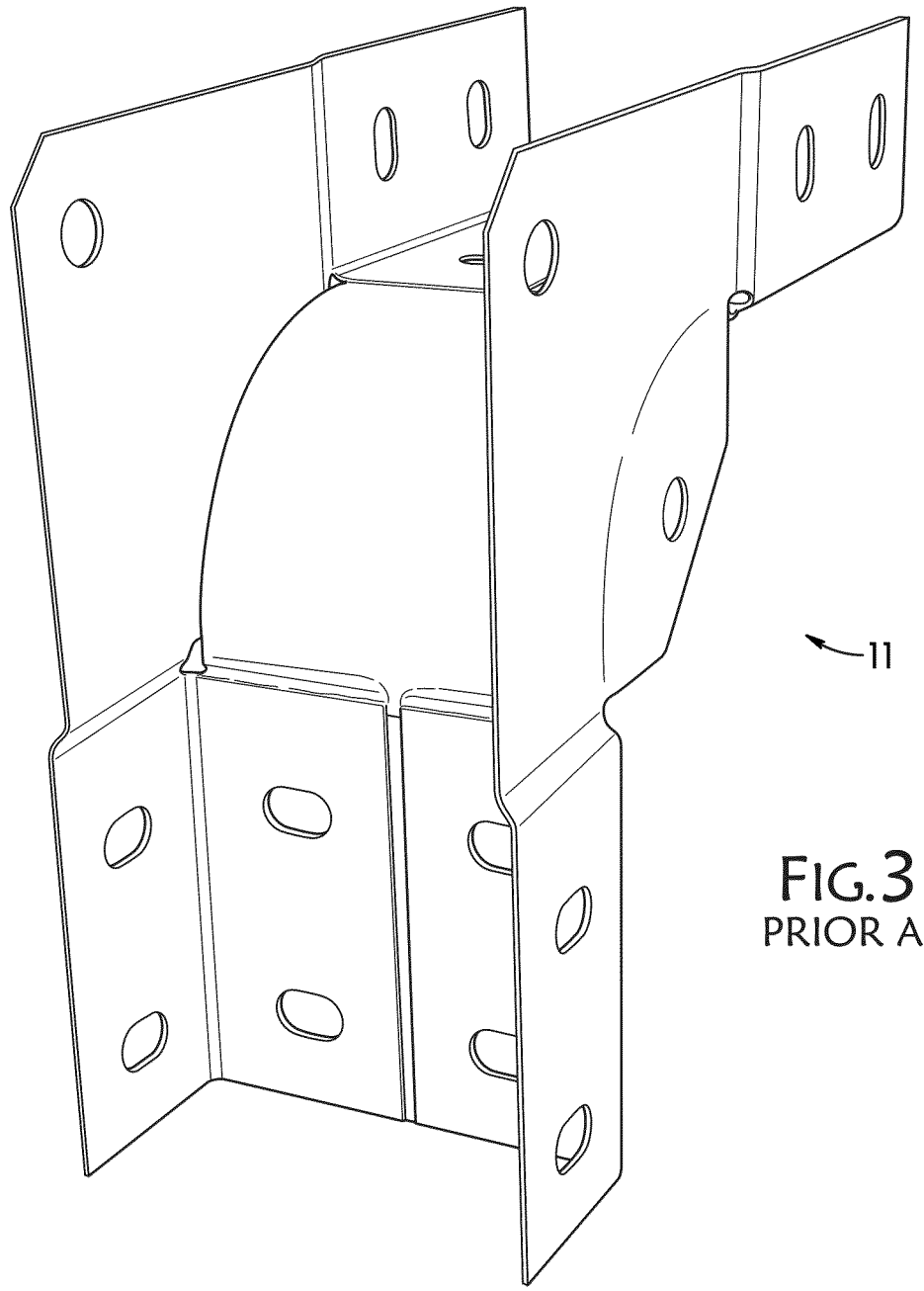
FIG. 3E shows a perspective view of a prior art welded vertical tray redirector.

Cable trays of various widths, such as those shown in the three prior art examples of FIGS. 3A, 3B, and 3C, can be attached to either end of a compatible 90-degree redirector or 45-degree redirector using the required number of bolts per cable tray. Wide cable trays such as the one shown in FIG. 3A can be attached to either end of 90-degree redirector 20 or 45-degree redirector 28 using four bolts per cable tray as required. The choice of cable tray will depend on the number and sizes of cables the tray is intended to carry. For example, a wide tray 36 as shown in FIG. 3A would be used to hold several cables or larger cables, a narrow tray 40 as shown in FIG. 3B would be selected when there are fewer cables or smaller cables to be carried. The cable tray 44 in FIG. 3C is for carrying a single cable or guided or clamped cables, bundles or tubes, and the like. FIGS. 3D and 3E show perspective views of prior art vertical tray redirectors (10, 11).

The term "cable" will be used herein to indicate anything carried by a cable tray; including wiring, electrical cables, telephone cables, pipes for fluid delivery, pneumatic tubing, optical fibers, optical fiber bundles, and the like. The term "tray" or "cable tray" refers to a metal tray with a floor and a wall on at least one side of the floor. The tray serves as a physical support and confinement for at least one cable running from one end of the tray to the other.

Redirectors 20 and 28 and cable trays 36, 40, and 44 may have round, square, slotted, or a combination of round, square, and slotted holes formed therein to received various types of fasteners (not shown in FIGS. 1-5) that keep cables in place such as clamps or guides and for connecting tray sections and redirectors.

Figure 4:
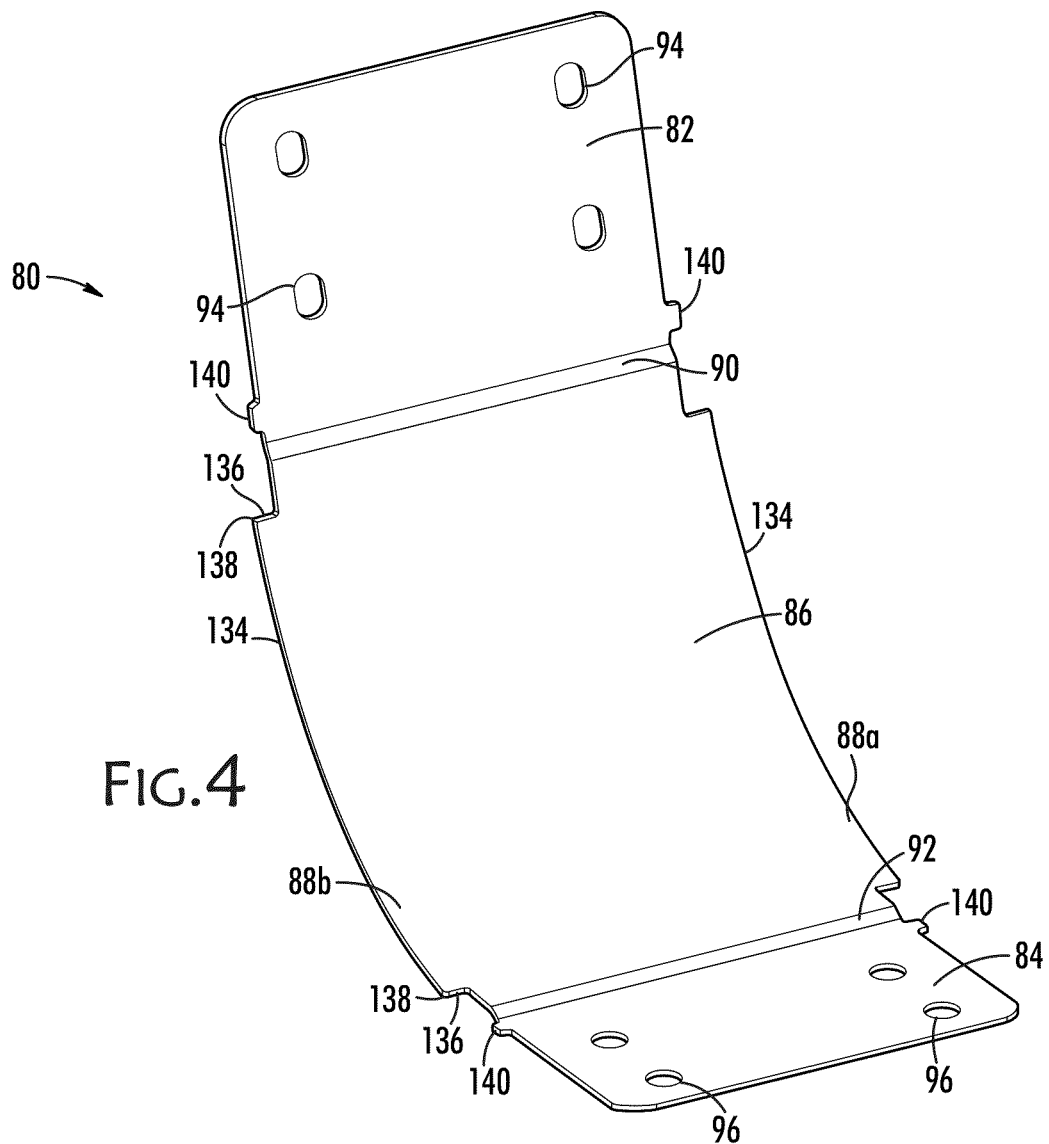
FIG. 4 is a perspective view of a vertical redirector base, according to an aspect of the disclosure.

An example of a vertical redirector base 80, according to the present disclosure, is shown in perspective in FIG. 4. Vertical redirector base 80 includes a first end 82, a second end 84, wherein the first end 82 and the second end 84 are spaced apart from each other, a deck 86, connecting the first end 82 and the second end 84, and a pair of opposed tabs (88a, 88b). The first end 82 and the second end 84 contain a front surface, a back surface, and an outer end. The deck 86 contains a front surface, a back surface, and a pair of opposed tabs (88a, 88b) on the sides of the deck 86. The deck 86 is preferably curved as illustrated in FIG. 4. An optional first transition 90 is defined by the intersection of the deck 86 and the first end 82, and a second transition 92 is defined by the intersection of the deck 86 and the second end 84. The first transition 90 serves as a transition portion between the deck 86 and the first end 82 that is offset from the deck 86. The offset at the first transition 90 between deck 86 and first end 82 provides a smooth transition and can receive portion of a cable tray 36 placed adjacent the first end 82, reducing the probability of cable damage by providing a smooth transition between the connected cable tray 36 and vertical redirector base 80.

Likewise, an optional second transition 92 serves as a transition portion between the deck 86 and the second end 84 that is offset from the deck 86. The offset at the second transition 92 between deck 86 and second end 84 provides a smooth transition and can receive a portion of a cable tray 36 placed adjacent the second end 84, reducing the probability of cable damage by providing a smooth transition between the connected cable tray 36 and vertical redirector 78.

Figure 5:
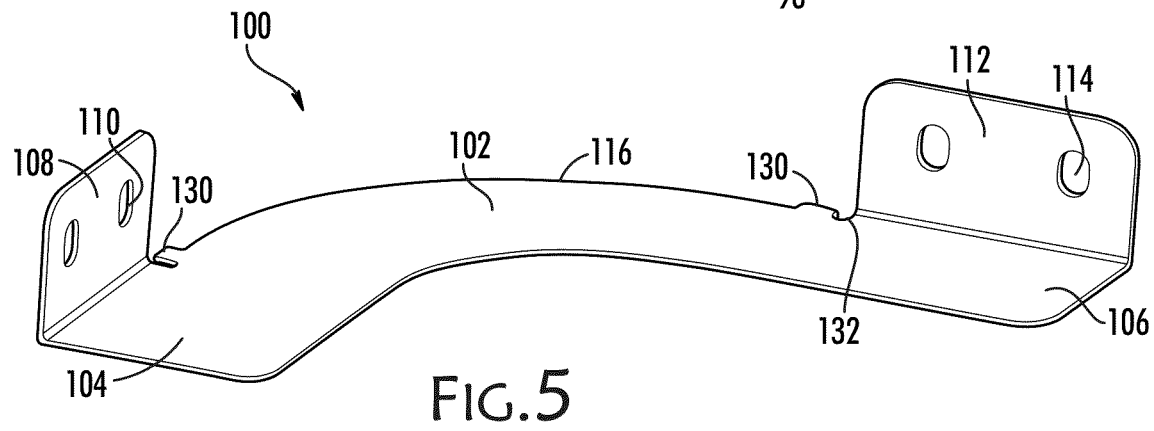
FIG. 5 is a perspective view of a flange fitting, according to an aspect of the disclosure.

The tabs (88a, 88b) of deck 86 engage flange fittings 100, shown in FIG. 5. FIG. 5 is a perspective view of a flange fitting 100. The flange fitting 100 facilitates a cable redirection of about 90 degrees, for the sake of the present example. Those of ordinary skill will readily recognize that other angles for redirection are readily obtainable.

Referring specifically to FIGS. 4 and 5, the deck 86 of vertical redirector base 80, of FIG. 4, may receive a curved flange fitting 100, of FIG. 5, against tab 88a and tab 88b. Flange fitting 100 includes a curved portion 102, a first end 104 and a second end 106. First end 104 carries a first flange 108 with at least one hole 110 formed therein. Second end 106 carries a second flange 112 with at least one hole 114. Holes 110, 114, that are provided for attaching flange fitting 100 against tabs (88a, 88b) of deck 86, are preferably slotted holes to provide flexibility for connecting industrial components together.

Figure 6A:
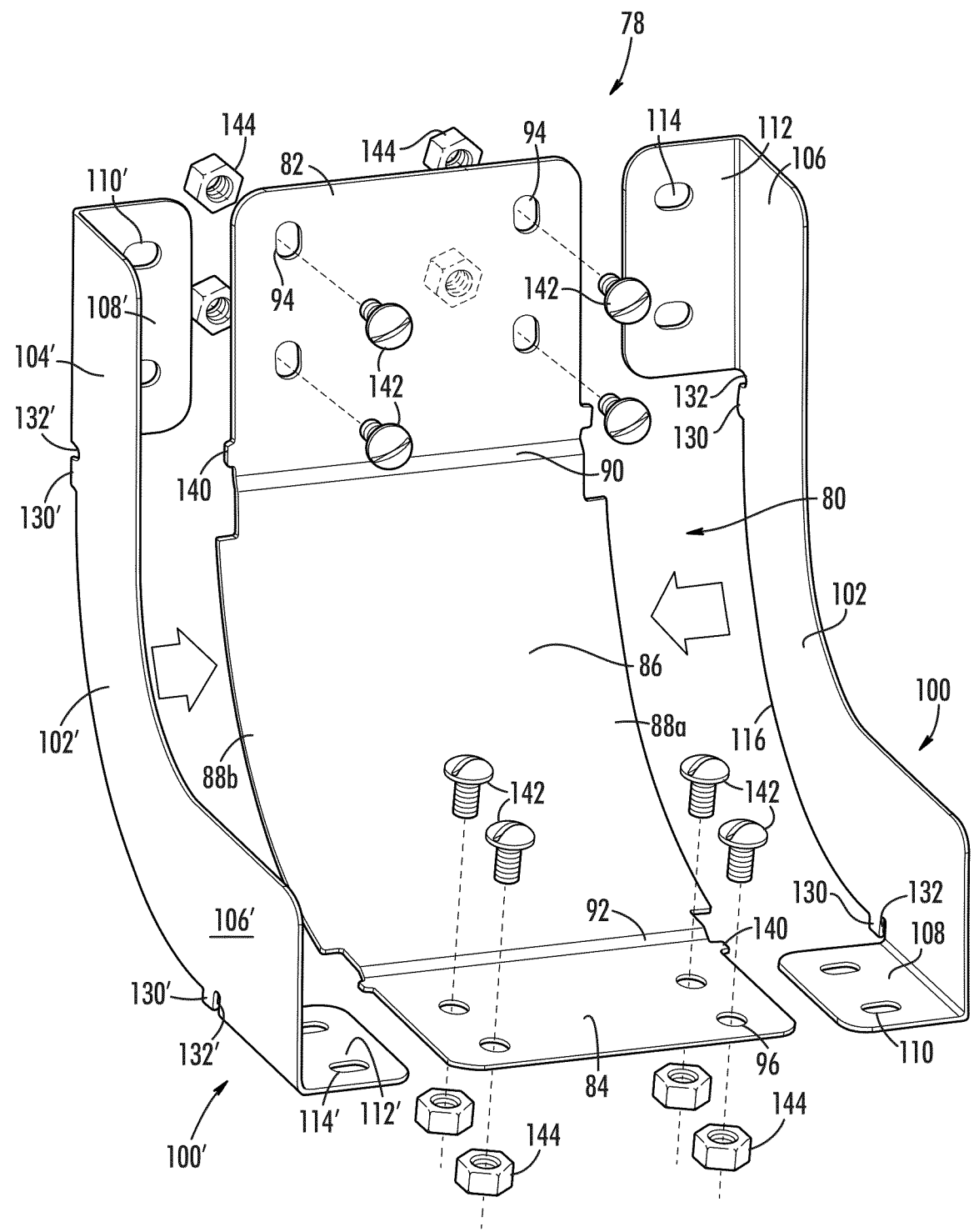
FIG. 6A shows an exploded, perspective view of a vertical redirector with two flange fittings in position to be joined to the vertical redirector base, according to an aspect of the disclosure.

Also, referring to FIGS. 6A and 6B, the first flange 108 and second flange 112 of the flange fitting 100 elevates the bottom 116 of curved portion 102 so it clears the top of the tab 88a of deck 86 when flange fitting 100 is being attached to deck 86. The elevation of the curved portion 102 of each flange fitting 100 enables the curved portion 102 to fit above the tab 88b of the deck 86 and is a feature of the present disclosure. The flange fitting 100 contains a tooth 130 extending outwardly from the curved portion 102 adjacent the first flange 108 and a tooth 130 extending outwardly from the curved portion 102 adjacent the second flange 112. Recesses 132 are disposed within the curved portion 102, extending from the outer edge of the curved portion 102 and into the curved portion 102 between the tooth 130 and the first flange 108 and the second flange 112 and having a u-shape. Likewise, flange fitting 100' contains a tooth 130' extending outwardly from the curved portion 102' adjacent the second flange 112' and a tooth 130' extending outwardly from the curved portion 102' adjacent the first flange 108'. Recesses 132' are disposed within the curved portion 102', extending from the outer edge of the curved portion 102' and into the curved portion 102' between the tooth 130' and the first flange 108' and the second flange 112' and having a u-shape.

Each tab (88a, 88b) contains an outer edge 134 that extends to two opposed, spaced-apart shoulders 136. The shoulders 136 extend from an outer edge of the deck 86 to the outer edge 134 of the tab (88a, 88b) and on opposite ends of the deck 86. A first shoulder 136 is disposed adjacent the first end 82 and the second shoulder 136 is disposed adjacent the second end 84. As illustrated in FIG. 4, the shoulders 136 extend from the outer edge of the deck 86 at a 90° angle outwardly from the outer edge of the deck 86. A corner 138 is formed at the intersection of the shoulders 136 and the outer edge of the deck 86. While the shoulders 136 are adjacent the first end 82 and the second end 84, respectively, the shoulders 136 are spaced apart from the first end 82, first transition 90, second end 84, and second transition 92, as illustrated in FIG. 4. A securing member 140 extends outwardly from both of the two opposed sides of the first end 82 and the second end 84, as also illustrated in FIG. 4.

FIGS. 6A and 6B show perspective views to illustrate moving flange fittings 100 into position onto deck 86 to form a vertical redirector 78 of the present disclosure. Flange fittings 100 are moved toward each side of the deck 86, with tab 88a centered so it can slide between first flange 108 and second flange 112 of one flange fitting 100, and tab 88b centered so it can slide between first flange 108' and second flange 112' of the second flange fitting 100' on the opposite side of the deck 86. First flange 108 and second flange 112 slide under deck 86 as curved portion 102 slides over tab 88a and is positioned so that holes 94, 96, in first end 82 and second end 84, respectively, are aligned with at least one hole 114 in first flange 112 or at least one hole 110 in second flange 108, respectively, of the one flange fitting. Similarly, first flange 108' and second flange 112' slide under deck 86 as curved portion 102' slides over tab 88b and is positioned so that holes 94, 96, in first end 82 and second end 84, respectively, are aligned with at least one hole 110' in first flange 108' or at least one hole 114' in the second flange fitting 112'. The teeth 130 and 130' press against respective securing members 140 establishing the inside width between flange fittings 100 and 100'. The recesses 132 and 132' provide clearances necessary for forming the flange fitting and assembly of the vertical redirector 78. The flange fitting 100 and 100' does not extend beyond the first end 82 and the second end 84 of the vertical redirector base 80 or the outer edge of the receiving portion of the first end 82 or the second end 84.

FIG. 6B shows a completely assembled vertical redirector 78. All of the components: vertical redirector base 80, flange fittings 100 and 100', eight sets of fasteners (bolts 142 and nuts 144) comprise a vertical redirector kit for connecting two cable trays 36 (not included as part of the kit). The components within the kit may be housed within a container, such as a bag, box, bin, or the like for storage, shipment, and containing all components within the kit together until assembly and use.

It should be noted that in FIGS. 6A and 6B a total of eight bolts and nuts are needed to hold two cable trays within the non-welded cable tray redirector. FIG. 6B shows the same number: eight bolts and nuts, used to hold two cable trays to the vertical redirector 78 without any welding needed to complete the vertical redirector components or assembly. The cost and time to weld cable tray redirectors has been completely avoided. Cables (not shown) may be placed onto vertical redirector 78 beginning at first cable tray 36, then across deck 86 and onto second cable tray 36'. First cable tray 36 and second cable tray 36' are secured to redirector base 80 using bolts 142 entering from the inside of first and second cable trays 36 and 36', respectively, and being fastened with nuts 144 from below the vertical redirector 78.

FIGS. 7, 8, 9A, 9B, and 9C illustrate another exemplary embodiment of the vertical redirector 78 and its component parts that contain all of the structures of the vertical redirector 78 illustrated in FIGS. 4, 5, 6A, and 6B and described above. The deck 86 in this embodiment may also contain two spaced-apart notches 146 disposed within each tab (88a, 88b), as shown in FIG. 7. Each notch 146 is preferably disposed within the center of each tab (88a, 88b) having two opposed side portions extending from the upper edge of the tab (88a, 88b) to a bottom edge between each side portion. A securing member 140 extends outwardly from both of the two opposed sides of the first end 82 and the second end 84, as also illustrated in FIGS. 4 and 6A. The flange fitting 100 contains a finger 148 extending from the curved portion 102, as illustrated in FIG. 8. The finger 148 extends outwardly from the bottom 116 of the curved portion 102 then perpendicularly to the curved portion 102 and is parabolic shaped having a conical upper portion.

Figure 9A:
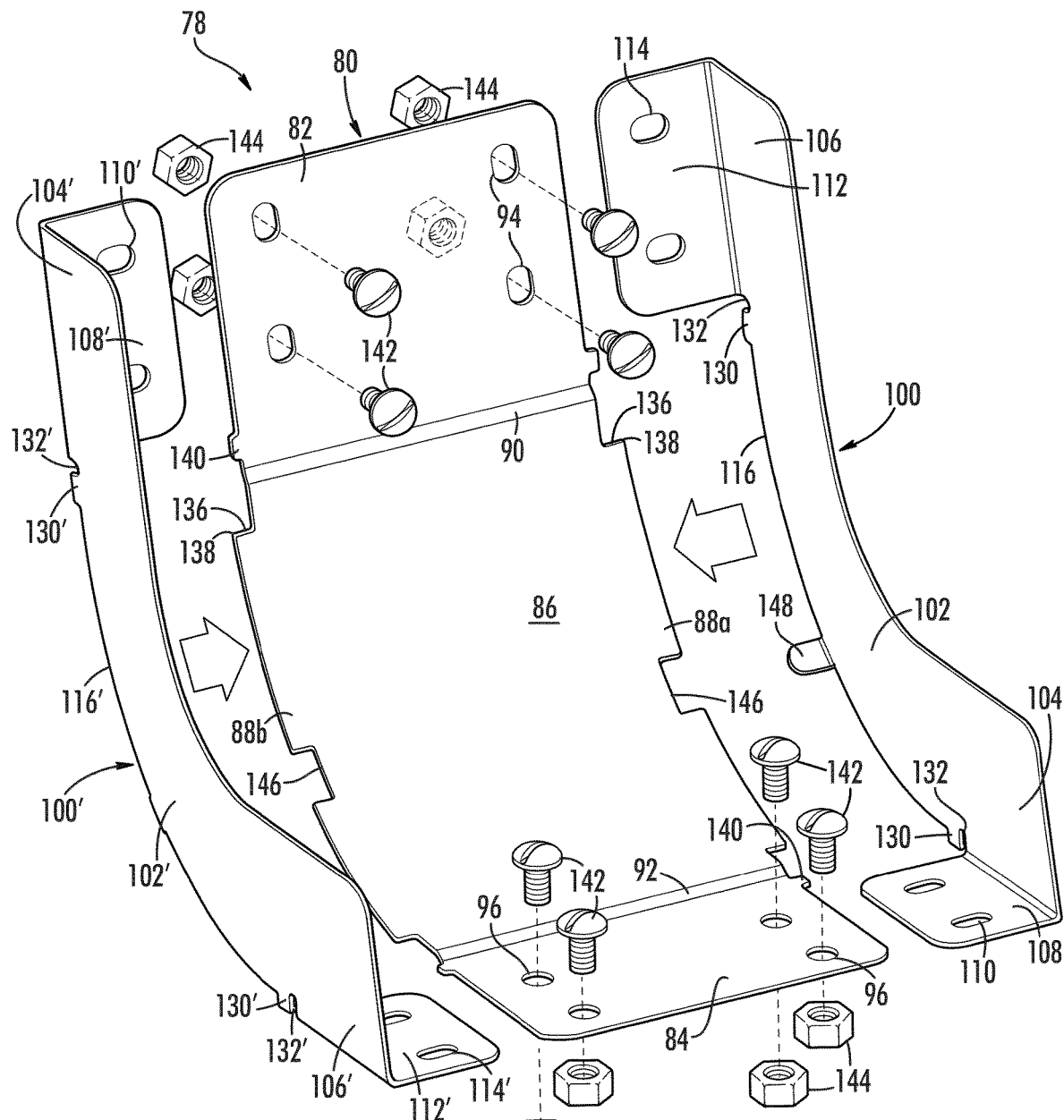
FIG. 9A shows an exploded, perspective view of a vertical redirector with two flange fittings in position to be joined to the vertical redirector base, according to an aspect of the disclosure.
Figure 9B:
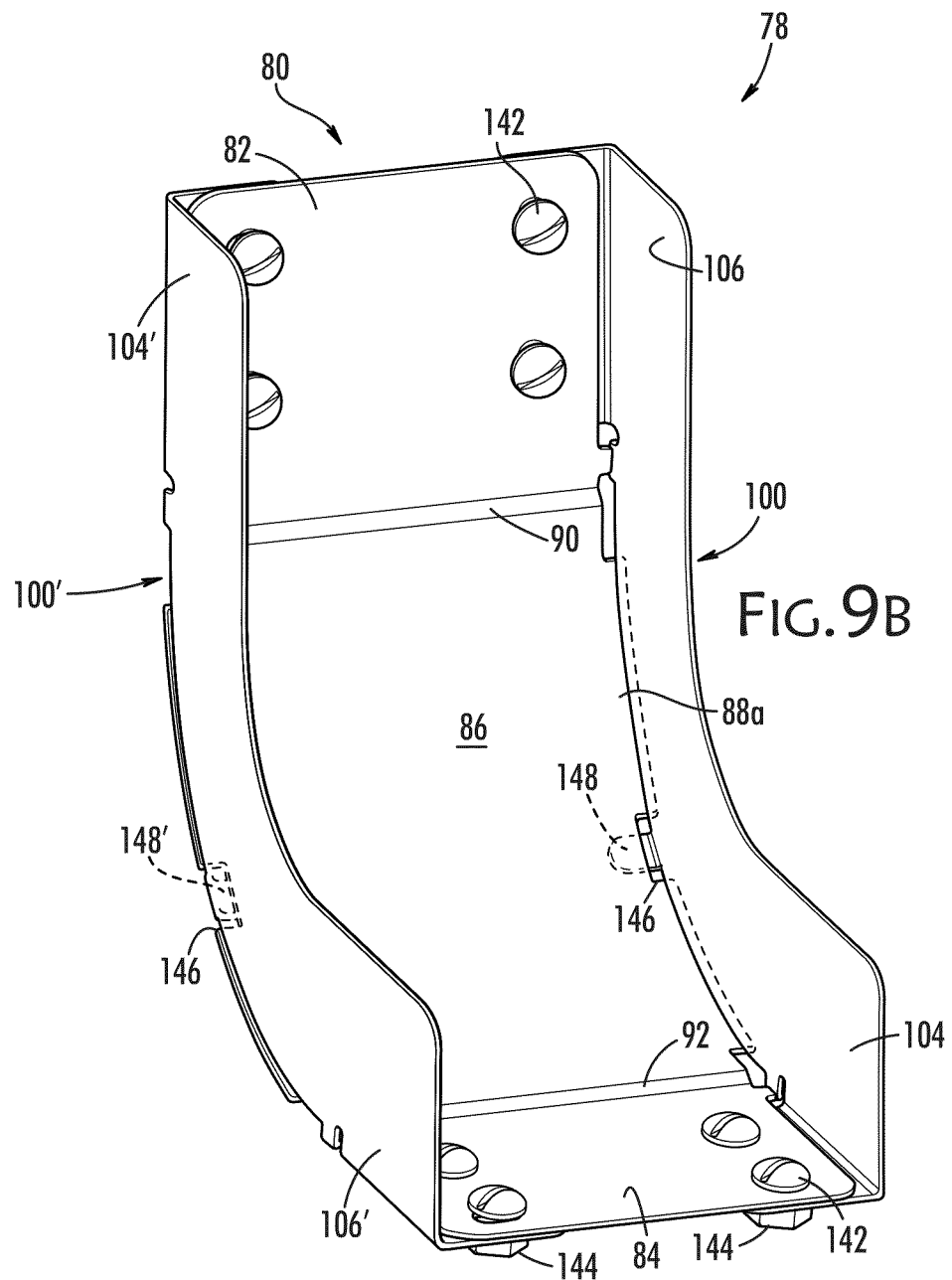
FIG. 9B shows an assembled, perspective view of the vertical redirector of FIG. 9A with two flange fittings engaged to the vertical redirector base, according to an aspect of the disclosure.
Figure 9C:
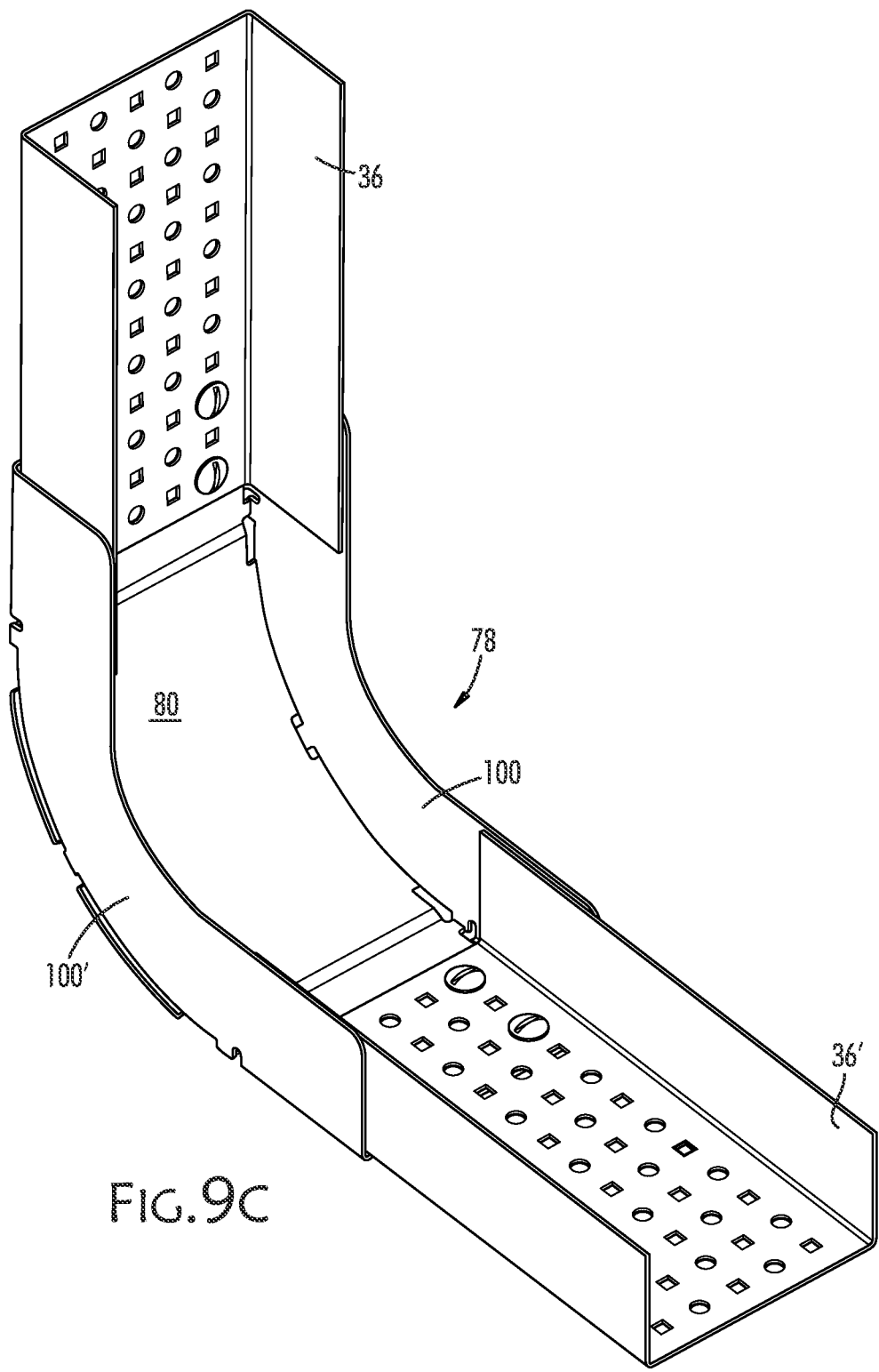
FIG. 9C shows an assembled, perspective view of the vertical redirector of FIGS. 9A and 9B with two flange fittings engaged to the vertical redirector base and two cable trays attached, according to an aspect of the disclosure.

FIGS. 9A, 9B, and 9C show perspective views to illustrate moving flange fittings 100 and 100' into position onto deck 86 to form a vertical redirector 78 of the present disclosure. Flange fittings 100 are moved toward each side of the deck 86, with tab 88a centered so it can slide between first flange 108 and second flange 112 of one flange fitting 100, and tab 88b centered so it can slide between first flange 108' and second flange 112' of the second flange fitting 100' on the opposite side of the deck 86. First flange 108, second flange 112, and finger 148 slide under deck 86 as curved portion 102 slides over tab 88a and finger 148 slides under notch 146. The flange fitting 100 is positioned so that holes 94, 96, in first end 82 and second end 84, respectively, are aligned with at least one hole 110 in first flange 108 or at least one hole 114 in second flange 112, respectively, of the one flange fitting. Similarly, first flange 108', second flange 112', and finger 148' slide under deck 86 as curved portion 102' slides over tab 88b and finger 148' slides under notch 146. The flange fitting 100' is positioned so that holes 94, 96, in first end 82 and second end 84, respectively are aligned with at least one hole 110' in first flange 108' or at least one hole 114' in second flange 112', respectively, of the second flange fitting 100'. The teeth 130 and 130' press against respective the securing members 140 establishing the inside width between flange fittings 100 and 100'. The recesses 132 and 132' provide clearances necessary for forming the flange fitting and assembly of the vertical redirector 78. The flange fittings 100 and 100' do not extend beyond the first end 82 and the second end 84 of the vertical redirector base 80 or the outer edge of the receiving portion of the first end 82 or the second end 84.

Figure 16C:
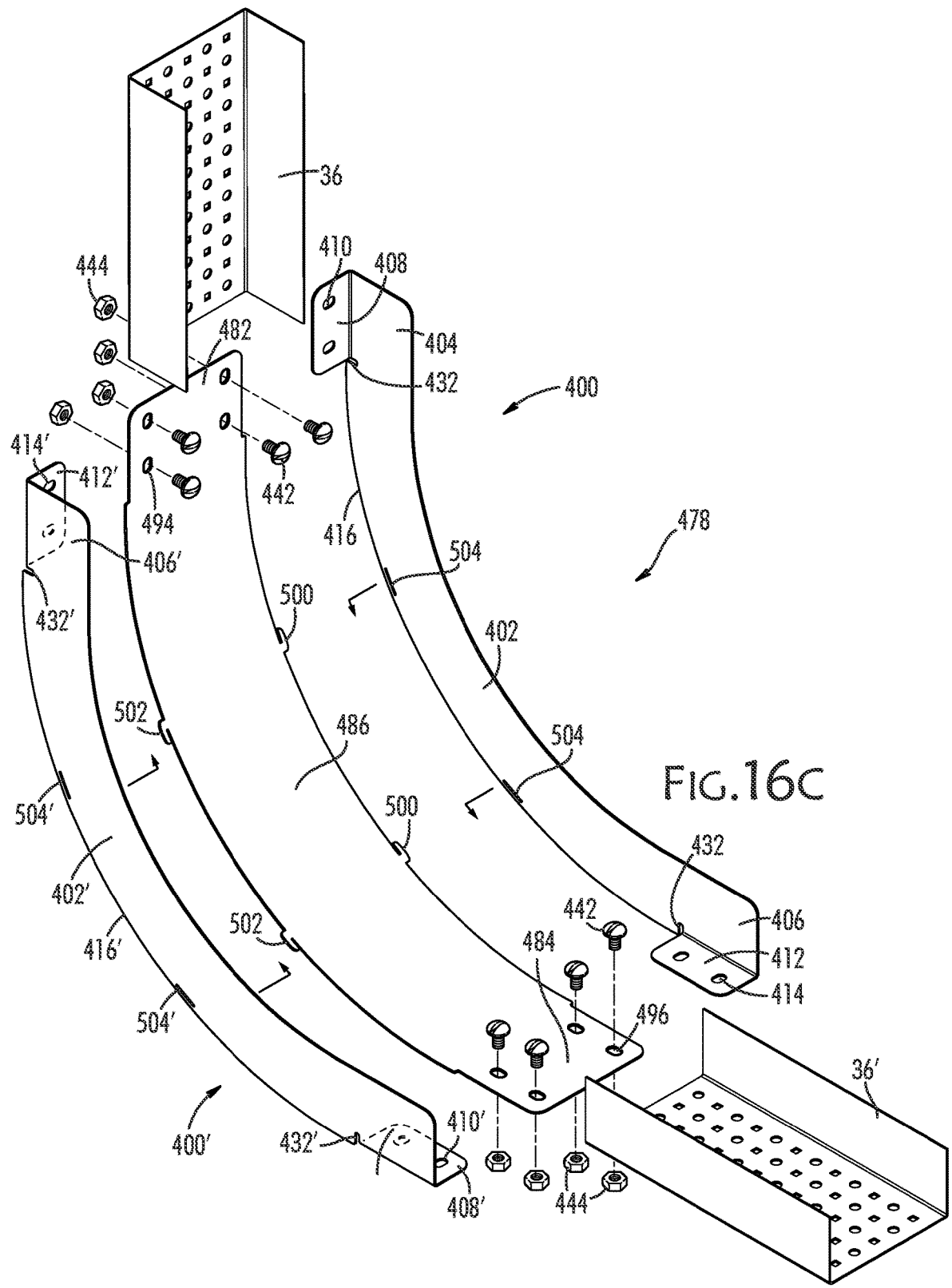
FIG. 16C shows an exploded, perspective view of a vertical redirector with two flange fittings in position to be joined to the vertical redirector base and two cable trays, according to an aspect of the disclosure.
Figure 16D:
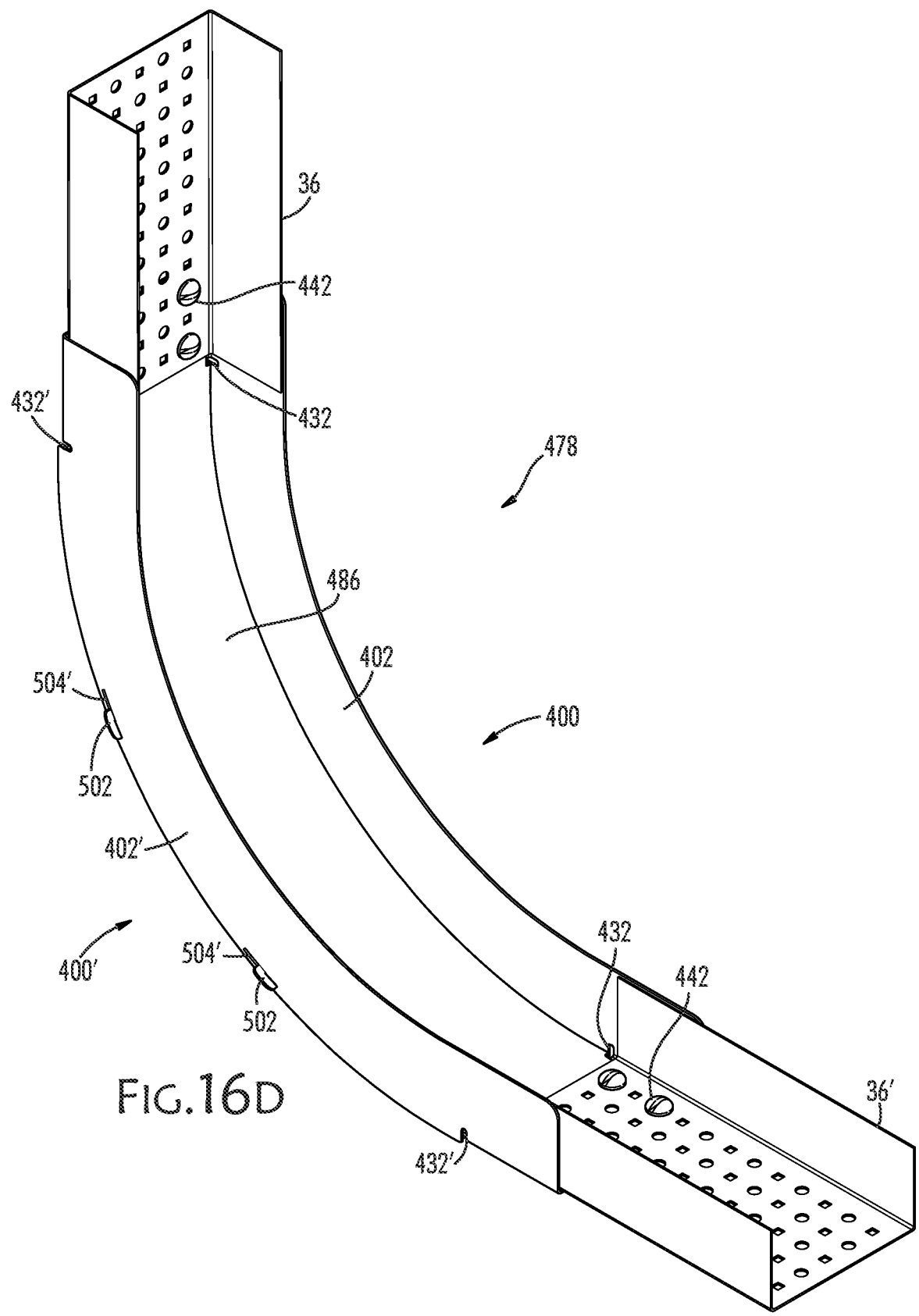
FIG. 16D shows an assembled, perspective view of the vertical redirector of FIG. 16C with two flange fittings engaged to the vertical redirector base and two cable trays, according to an aspect of the disclosure.

For larger radius redirectors, hooks and slots similar to those shown in exemplary embodiment of a vertical redirector 478 shown in FIGS. 16C and 16D may be used to secure flanges to the base for additional stability.

Figure 9D:
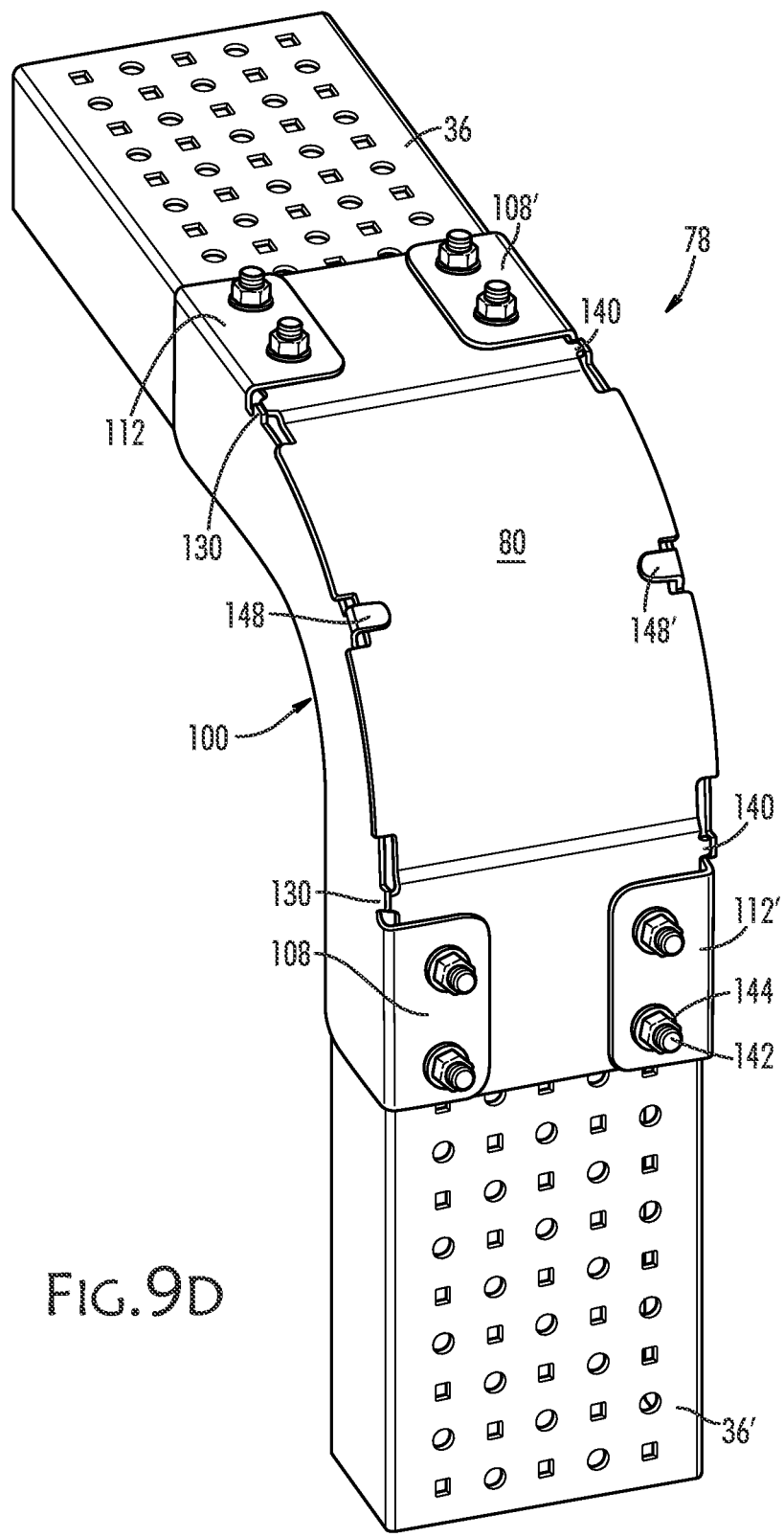
FIG. 9D shows an assembled, back perspective view of the vertical redirector of FIGS. 9A, 9B, and 9C with two flange fittings engaged to the vertical redirector base and two cable trays attached, according to an aspect of the disclosure.

FIGS. 9B, 9C, and 9D show a completely assembled vertical redirector 78. All of the components: vertical redirector base 80, flange fittings 100 and 100', eight sets of fasteners (bolts 142 and nuts 144) comprise a vertical redirector kit for connecting two cable trays 36 (not included as part of the kit). The components within the kit may be housed within a container, such as a bag, box, bin, or the like for storage, shipment, and containing all components within the kit together until assembly and use. Cables (not shown) may be placed onto vertical redirector 78 beginning at first cable tray 36, then across deck 86 and onto second cable tray 36'. First cable tray 36 and second cable tray 36' are secured to redirector base 80 using bolts 142 entering from the inside of first and second cable trays 36 and 36', respectively, and being fastened with nuts 144 from below the vertical redirector 78.

Figure 10:
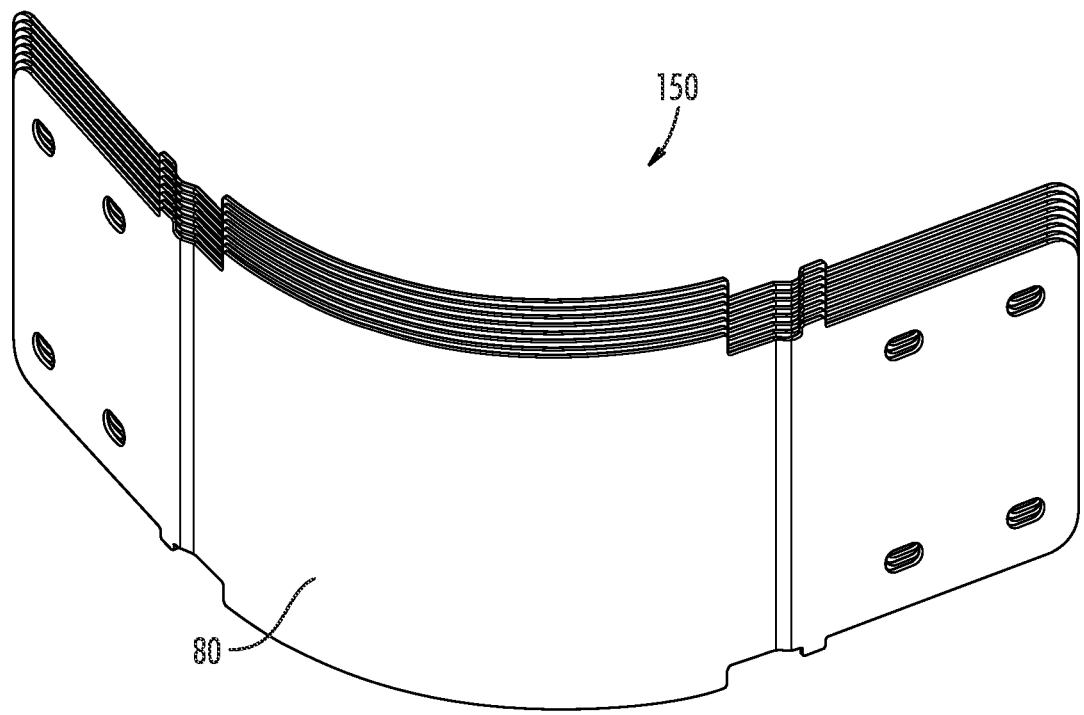
FIG. 10 is a perspective view of a nested stack of vertical redirector bases, according to an aspect of the disclosure

FIG. 10 shows a nested stack 150 of vertical redirector bases 80 of FIG. 4 for space-saving shipping and storage. Vertical redirector bases 80 can accept flange fittings 100 and two cable trays. Together vertical redirector bases 80 and flange fittings 100 of the present disclosure in quantity require considerably less volume for storage and shipping. While the vertical redirector bases 80 of FIG. 4 are shown in a nested stack 150, the vertical redirector bases of FIGS. 7, 13A, 15B, and 16A may also form a nested stack 150 in a similar arrangement.

Figure 11:
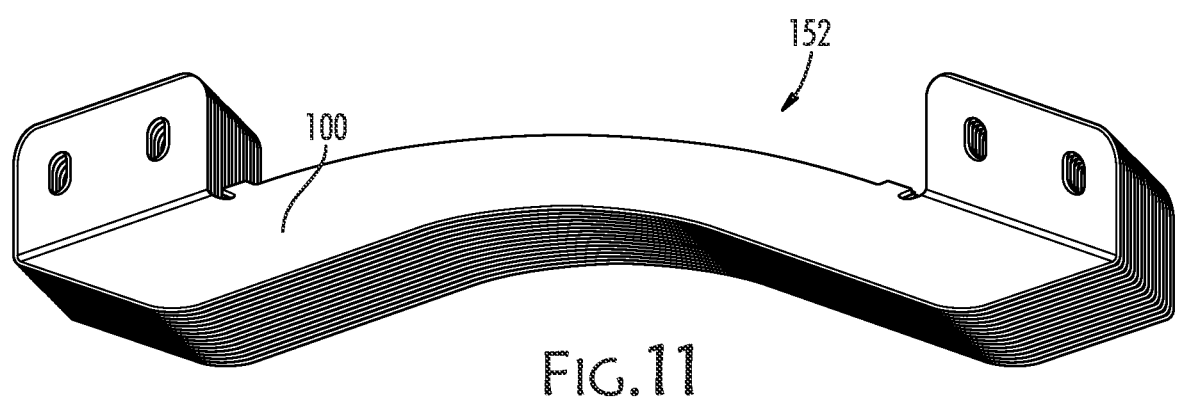
FIG. 11 is a perspective view of a nested stack of flange fittings, according to an aspect of the disclosure.
Figure 12:
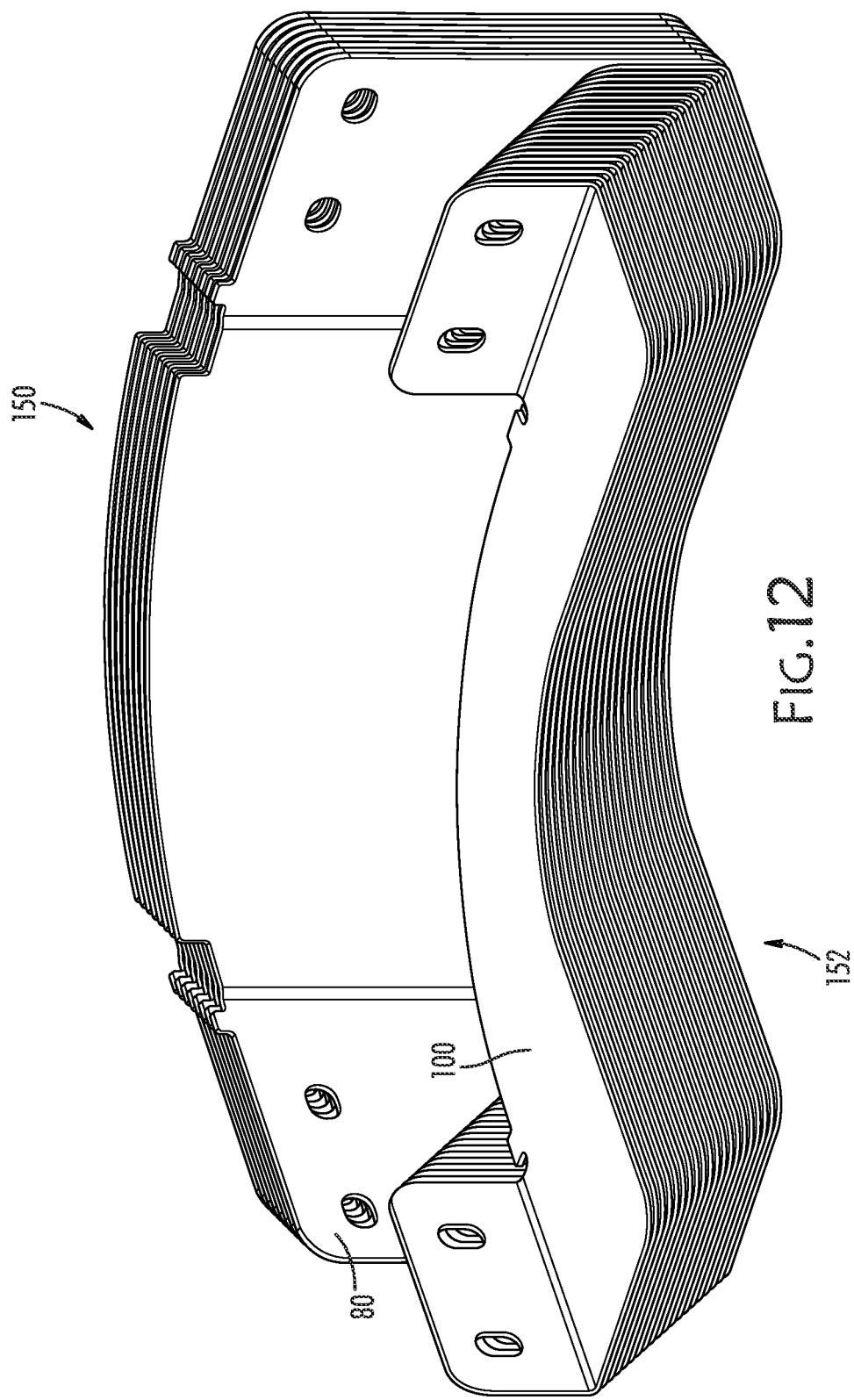
FIG. 12 is a perspective view of a nested stack of vertical redirector bases adjacent a nested stack of flange fittings, according to an aspect of the disclosure.

FIG. 11 shows a nested stack 152 of flange fittings 100 of FIG. 5, of the present disclosure for space-saving shipping or storage. Nested stack 152 uses packing space efficiently by nesting flange fittings 100. Nesting enables the number of units stored per unit of storage volume to increase as the number of units being stored increases: A plurality of flange fittings 100 can be stored more efficiently than one fully assembled vertical redirector of prior art welded redirectors. Nesting of items means that when nested stack 150 of vertical redirector bases 80 and nested stack 152 of flange fittings 100 are put in adjacent relationship, as shown in FIG. 12, at least part of the unused storage volume required to store the vertical redirector bases 80 or flange fittings 100 is used by the next part, so that the percent of unused volume in a stack of parts declines as the nesting efficiency increases. While the flange fittings 100 of FIG. 5 are shown in a nested stack 152, the flange fittings of FIGS. 8, 13B, 15A, 15C, and 16B may also form a nested stack 152 in a similar arrangement.

Figure 13A:
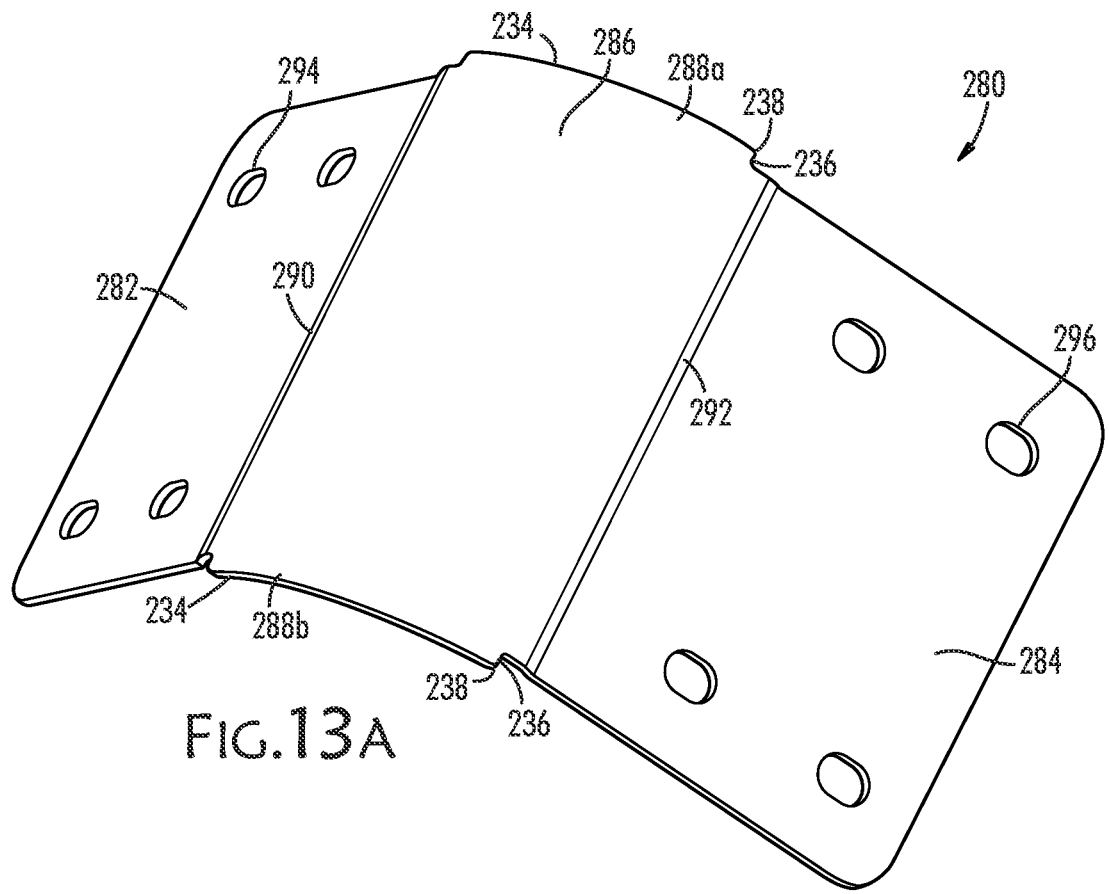
FIG. 13A is a perspective view of a vertical redirector base, according to an aspect of the disclosure.

Another exemplary embodiment of a vertical redirector 278 is shown in FIGS. 13A, 13B, 14A, 14B, and 14C. Vertical redirector base 280 includes a first end 282, a second end 284, wherein the first end 282 and the second end 284 are spaced apart from each other, a deck 286, connecting the first end 282 and the second end 284, and a pair of opposed tabs (288a, 288b). The first end 282 and the second end 284 contain a front surface, a back surface, and an outer end. The deck 286 contains a front surface, a back surface, and a pair of opposed tabs (288a, 288b) on the sides of the deck 286. The deck 286 is preferably curved as illustrated in FIG. 13A. An optional first transition 290 is defined by the intersection of the deck 286 and the first end 282, and a second transition 292 is defined by the intersection of the deck 286 and the second end 284. The first transition 290 serves as a transition portion between the deck 286 and the first end 282 that is offset from the deck 286. The offset at the first transition 290 between deck 286 and first end 282 provides a smooth transition and receiving portion of a cable tray 36 placed adjacent the first end 282, reducing the probability of cable damage by providing a smooth transition between the connected cable tray 36 and vertical redirector base 280.

Likewise, an optional second transition 292 serves as a transition portion between the deck 286 and the second end 284 that is offset from the deck 286. The offset at the second transition 292 between deck 286 and second end 284 provides a smooth transition and receiving portion of a cable tray 36 placed adjacent the second end 284, reducing the probability of cable damage by providing a smooth transition between the connected cable tray 36 and vertical redirector 278.

Figure 13B:
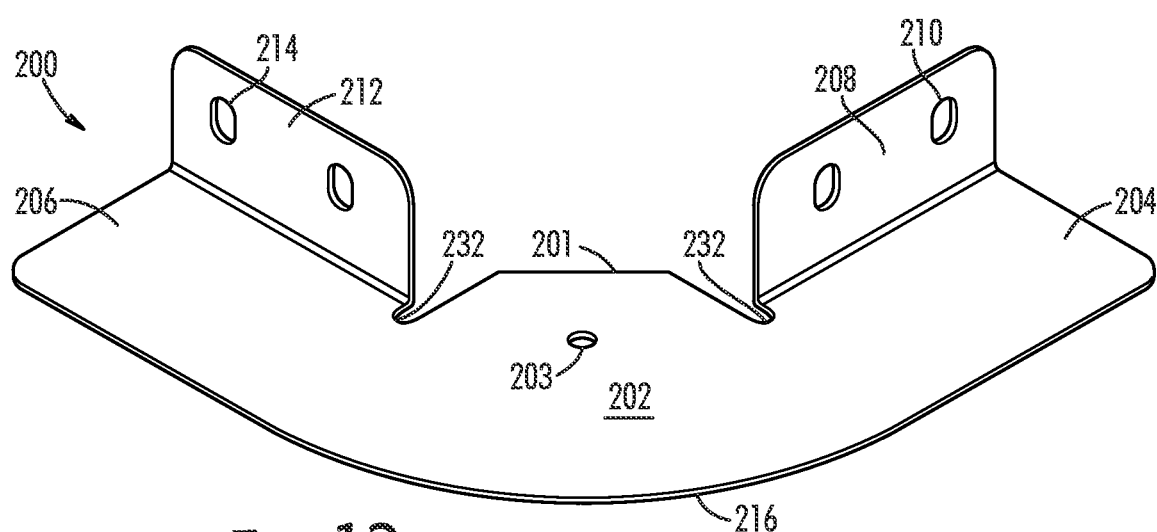
FIG. 13B is a perspective view of a flange fitting, according to an aspect of the disclosure.
Figure 14A:
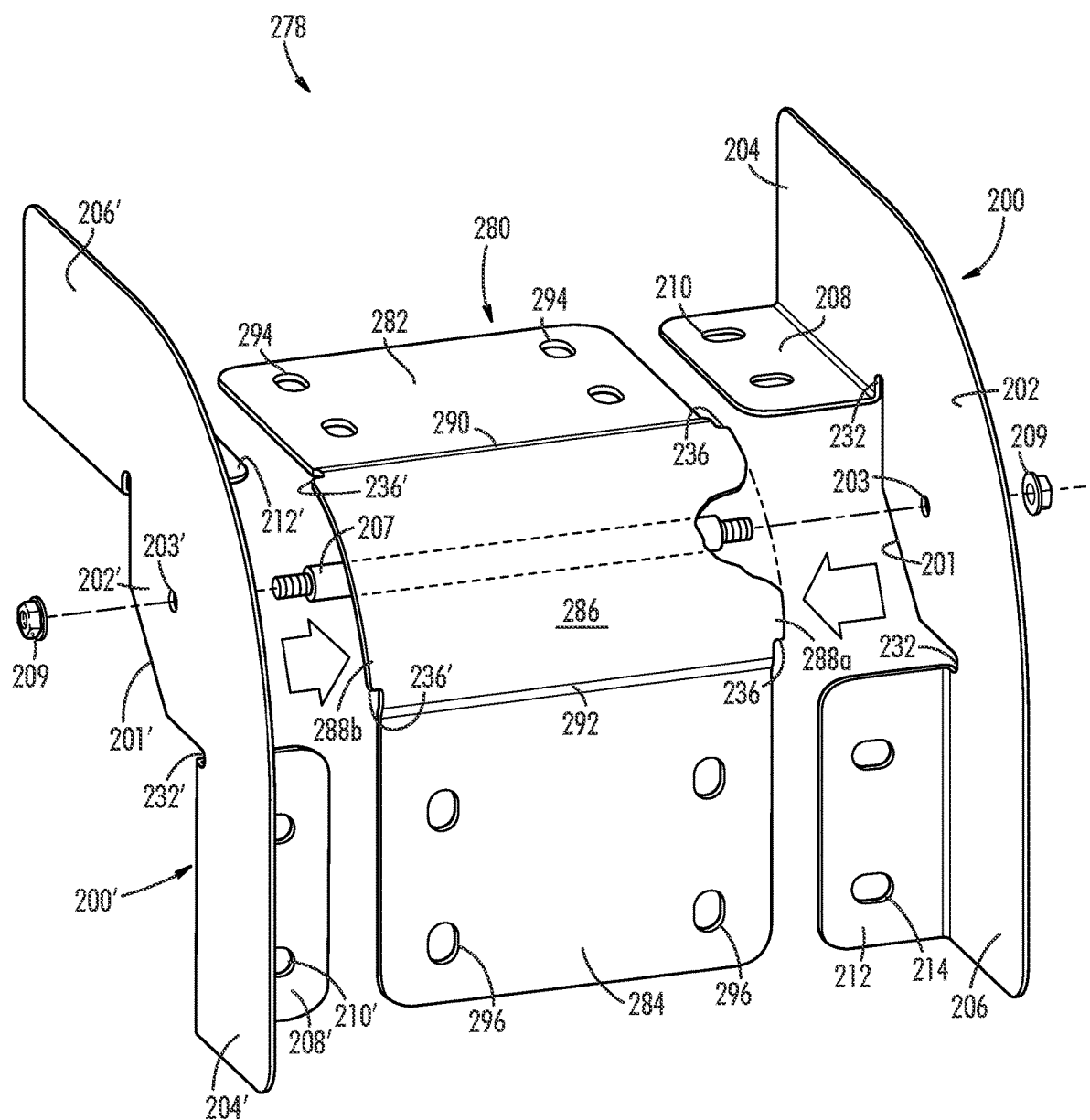
FIG. 14A shows an exploded, perspective view of a vertical redirector with two flange fittings in position to be joined to the vertical redirector base, according to an aspect of the disclosure.
Figure 14B:
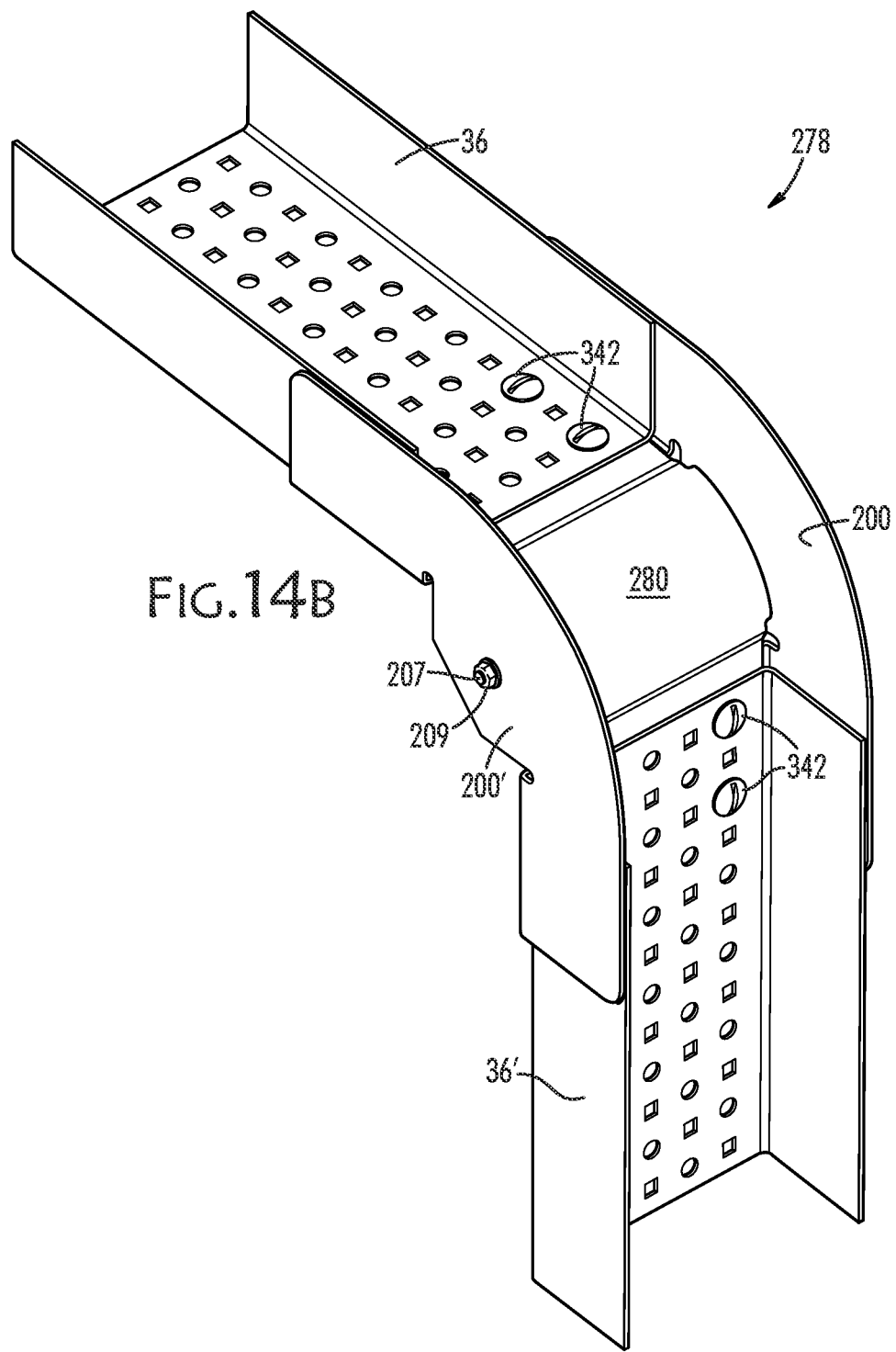
FIG. 14B shows an assembled, perspective view of the vertical redirector of FIG. 14A with two flange fittings engaged to the vertical redirector base and two cable trays, according to an aspect of the disclosure.
Figure 14C:
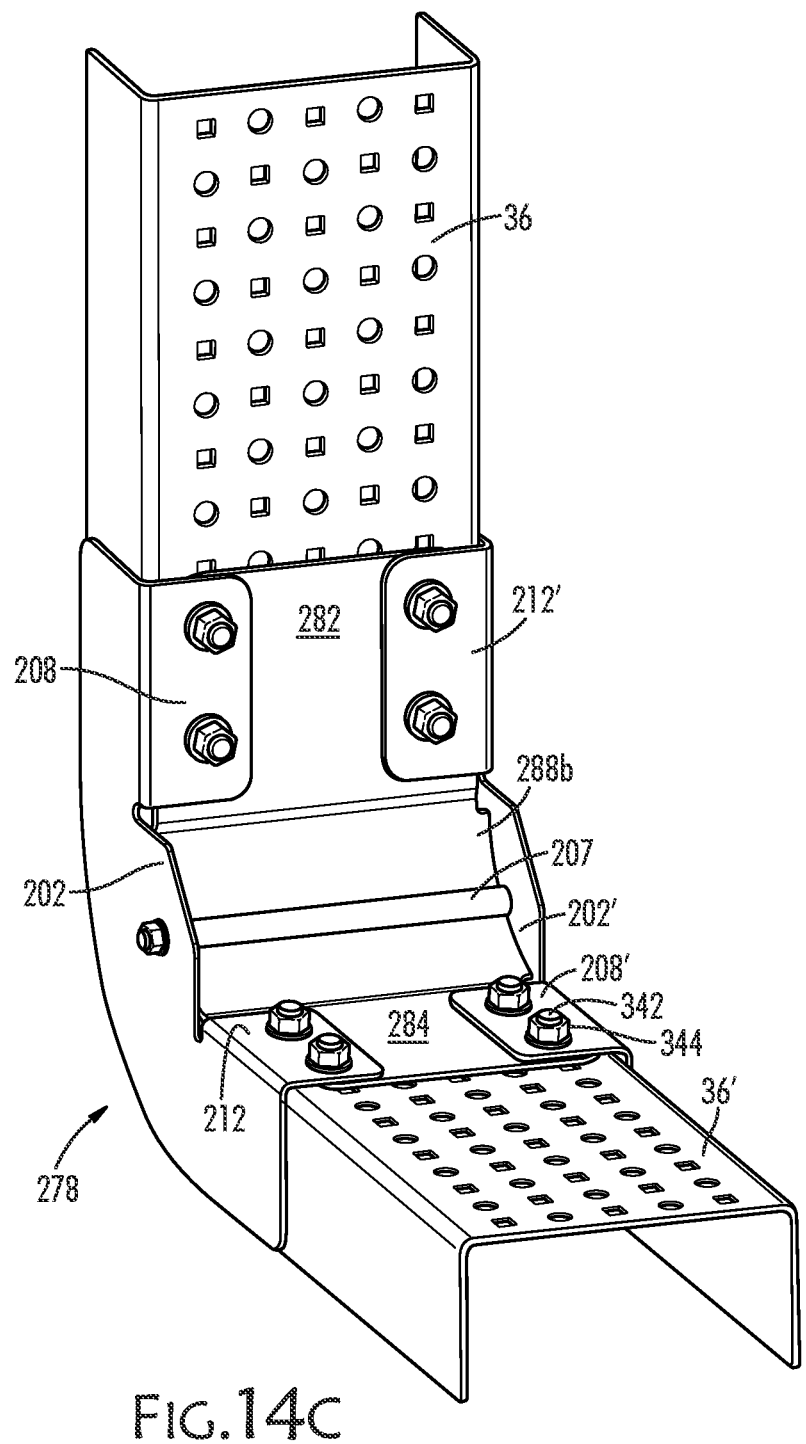
FIG. 14C shows an assembled, back perspective view of the vertical redirector of FIGS. 14A and 14B with two flange fittings engaged to the vertical redirector base and two cable trays, according to an aspect of the disclosure.

The tabs (288a, 288b) of deck 286 engage flange fittings 200, shown in FIGS. 14A, 14B, and 14C. FIG. 13B is a perspective view of a flange fitting 200. The flange fitting 200 facilitate a cable redirection of about 90 degrees, for the sake of the present example. Those of ordinary skill will readily recognize that other angles for redirection are readily obtainable.

Referring specifically to FIGS. 14A and 14B, the deck 286 of vertical redirector base 280 of FIG. 13A may receive a flange fitting 200 of FIG. 13B against tab 288a and tab 288b, as shown in FIGS. 14A and 14B. Flange fitting 200 includes a central portion 202, a first end 204, and a second end 206. First end 204 carries a first flange 208 with at least one hole 210 formed therein. Second end 206 carries a second flange 212 with at least one hole 214. Holes 210, 214, that are provided for attaching flange fitting 200 against tabs (288a, 288b) of deck 286, are preferably slotted holes to provide flexibility for connecting industrial components together.

The central portion 202 of the flange fitting 200 contains an angled tab 201. The central portion 202 is separated from the first flange 208 and the second flange 212 by a recess 232. The central portion 202 contains a first side portion and a second side portion, wherein the first side portion extends from the recess 232 adjacent the first flange 208 and is angled away from the first flange 208. The second side portion of the central portion 202 extends from the recess 232 adjacent the second flange 212 and is angled away from the second flange 212. A top portion extends between the first side portion and the second side portion, forming the outer edge of the central portion 202. As shown in FIG. 13B, the width of the central portion 202 decreases as the central portion proceeds from the recesses 232 to the outer edge of the top portion. A hole 203 is formed within the central portion 202.

Each tab (288a, 288b) contains an outer edge 234 that extends to two opposed, spaced-apart shoulders 236. The shoulders 236 extend from an outer edge of the deck 286 to the outer edge 234 of the tab (288a, 288b) and on opposite ends of the deck 286. A first shoulder 236 is disposed adjacent the first end 282 and the second shoulder 236 is disposed adjacent the second end 284. As illustrated in FIGS. 13A and 14A, the shoulders 236 extend downwardly from the outer edge of the tabs (288a, 288b). A corner 238 is formed at the intersection of the shoulders 236 and the outer edge of the deck 286.

FIGS. 14A and 14B show perspective views to illustrate moving flange fittings 200 into position onto deck 286 to form a vertical redirector 278 of the present disclosure. Flange fittings 200 are moved toward each side of the deck 286, with tab 288a centered so it can slide between first flange 208 and second flange 212 of one flange fitting 200, and tab 288b is centered so it can slide between first flange 208' and second flange 212' of the second flange fitting 200' on the opposite side of the deck 286. First flange 208 and second flange 212 slide under deck 286 as the outer edge of the tab 288a contacts the inner surface of the central portion 202 of the flange fitting 200. The shoulders 236 on opposed sides of the tab 288a are received between the recesses 232 of the flange fitting 200. The flange fitting 200 is positioned so that holes 294, 296, in first end 282 and second end 284, respectively, are aligned with at least one hole 210 in first flange 208 or at least one hole 214 in second flange 212, respectively, of the one flange fitting 200. Similarly, first flange 208' and second flange 212' of the second flange fitting 200' slide under deck 286 as the outer edge of the tab 288b contacts the inner surface of the central portion 202' of the flange fitting 200'. The shoulders 236' on opposed sides of the tab 288b are received within the recesses 232' of the flange fitting 200'. The flange fitting 200' is positioned so that holes 294, 296, in first end 282 and second end 284, respectively, are aligned with at least one hole 210' in first flange 208' or at least one hole 214' in second flange 212' of the second flange fitting 200'.

A support member 207 is positioned adjacent the vertical redirector base 280, as shown in FIG. 14A. The support member 207 contains a cylindrical body portion and externally threaded cylindrical end portions. The cylindrical end portions are inserted through the hole 203 within the central portions 202, 202' of the first flange fitting 200 and the second flange fitting 200'. Fastening elements 209, such as internally threaded nuts, are engaged to externally threaded cylindrical portions for providing support and stability to the vertical redirector base 280. The flange fitting 200 and 200' does not extend beyond the first end 282 and the second end 284 of the vertical redirector base 280 or the outer edge of the receiving portion of the first end 282 or the second end 284.

FIGS. 14B and 14C show a completely assembled vertical redirector 278 according to this embodiment. All of the components: vertical redirector base 280, flange fittings 200 and 200', support member 207, two fastening elements 209, and eight sets of fasteners (bolts 342 and nuts 344) comprise a vertical redirector kit for connecting two cable trays 36 (not included as part of the kit). The components within the kit may be housed within a container, such as a bag, box, bin, or the like for storage, shipment, and containing all components within the kit together until assembly and use.

As illustrated in FIG. 14B, first cable tray 36 and second cable tray 36' are secured to redirector base 280 using bolts 342 entering from the inside of first and second cable trays 36 and 36', respectively, and being fastened with nuts 344 from below the vertical redirector 278.

Where cable tray redirectors may be needed for a special or modified configuration in smaller quantities to satisfy a customer's specific requirement for a cable tray arrangement, the general design features of the present disclosure have an economic advantage for design and fabrication.

Figures 15A, 15B, 15C:
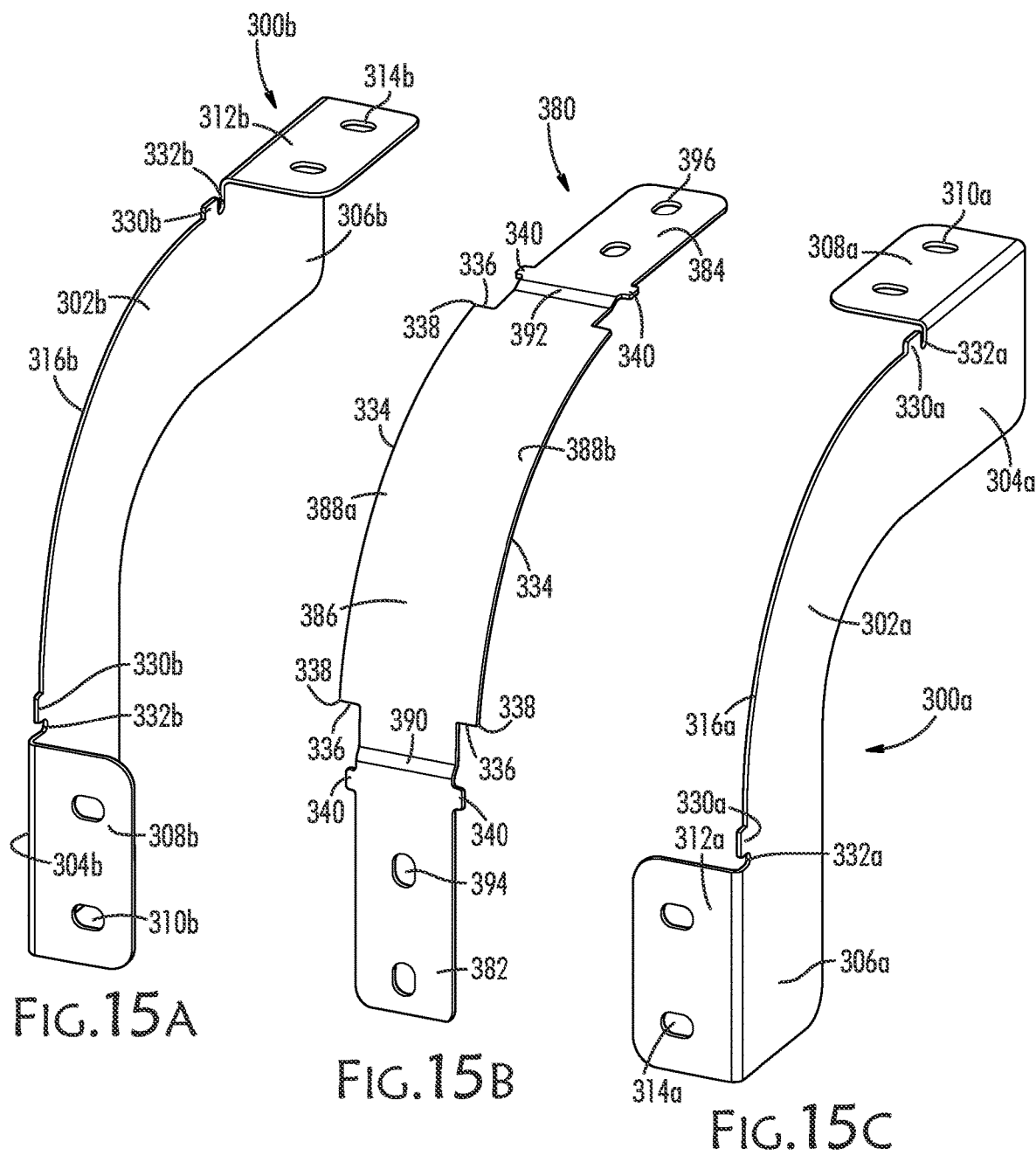
FIG. 15A is a perspective view of a flange fitting, according to an aspect of the disclosure.
FIG. 15B is a perspective view of a vertical redirector base, according to an aspect of the disclosure.
FIG. 15C is a perspective view of another flange fitting used in conjunction with the flange fitting of FIG. 15A, according to an aspect of the disclosure.
Figure 15D:
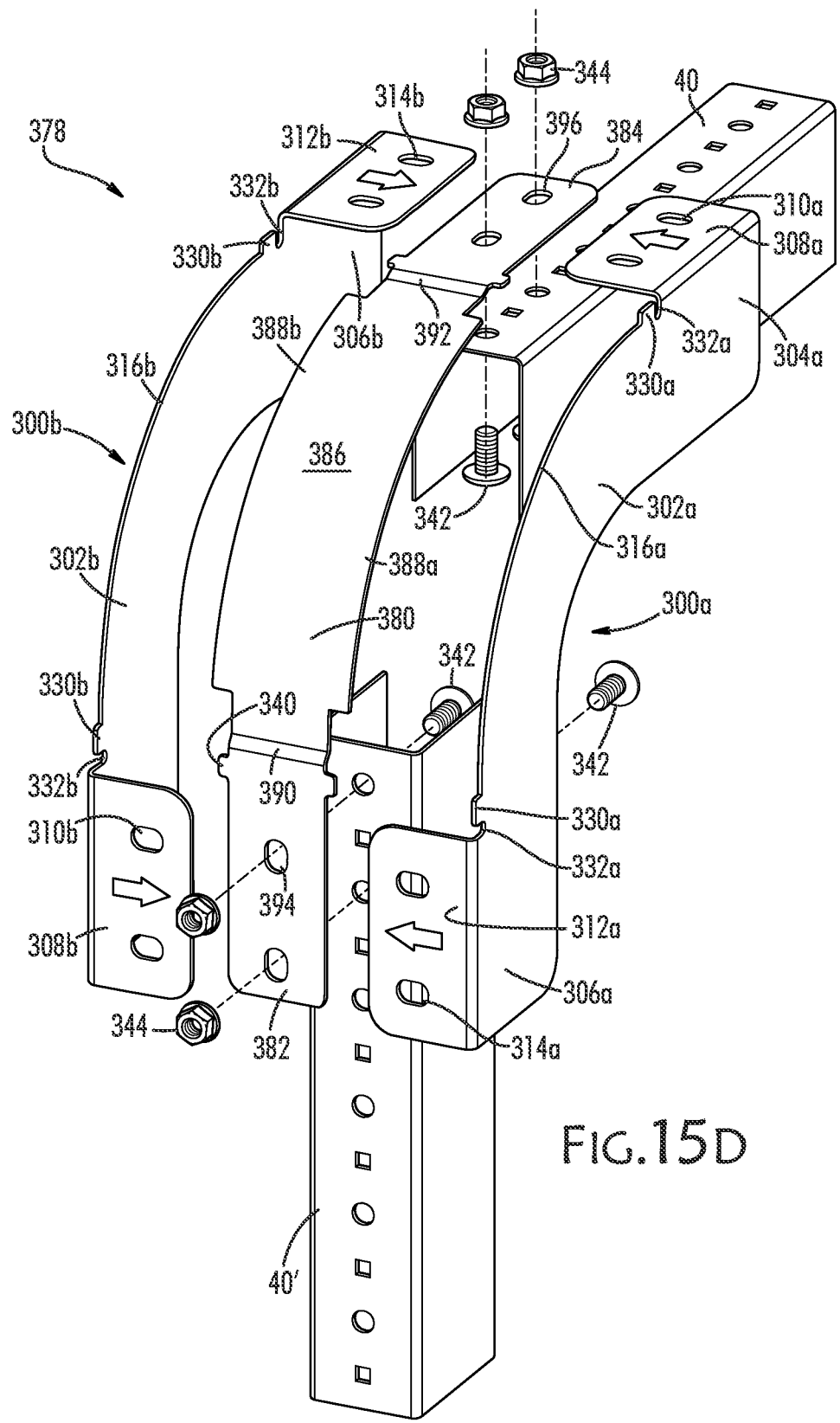
FIG. 15D shows an exploded, perspective view of a vertical redirector with two flange fittings in position to be joined to the vertical redirector base and two cable trays, according to an aspect of the disclosure.
Figure 15E:
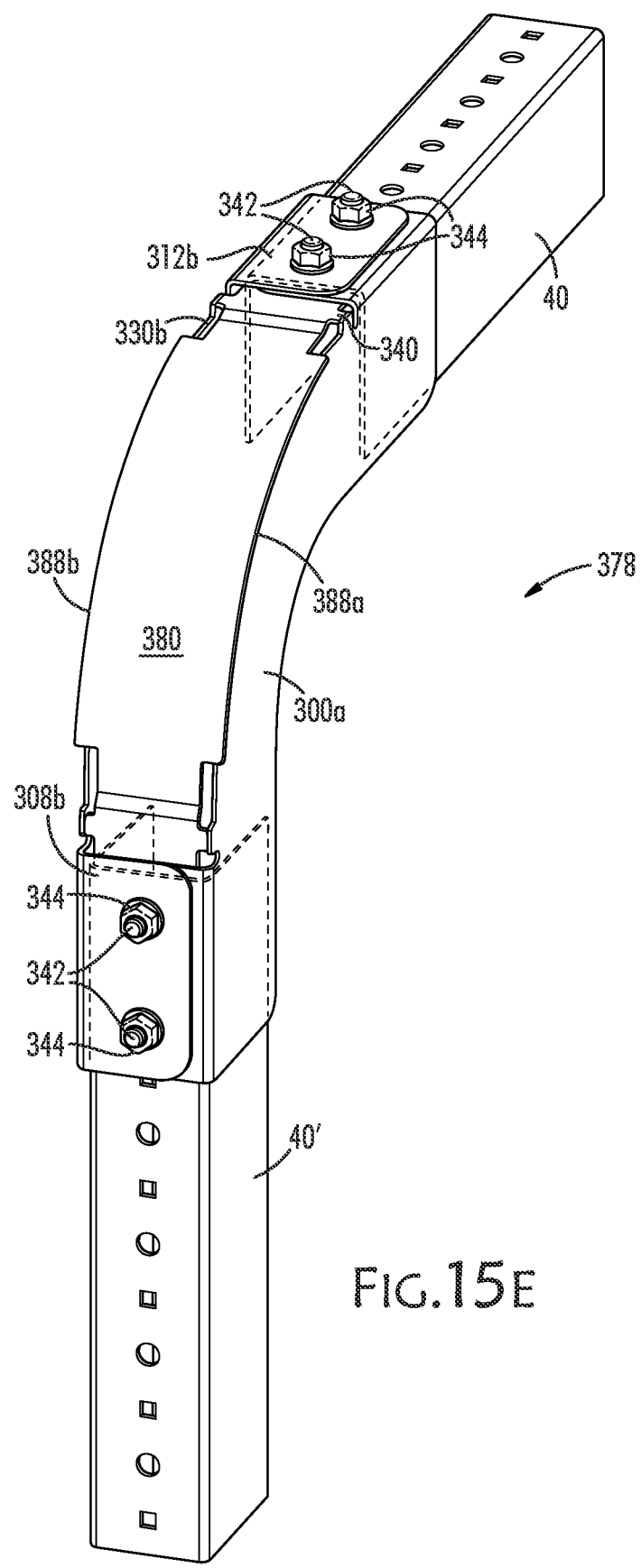
FIG. 15E shows an assembled, back perspective view of the vertical redirector of FIG. 15D with two flange fittings engaged to the vertical redirector base and two cable trays, according to an aspect of the disclosure.

FIGS. 15A, 15B, 15C, 15D, and 15E show a perspective view of a narrow vertical redirector 378. The flange fittings 300a and 300b within this embodiment have similar structural features as the flange fitting illustrated in FIG. 5. In this embodiment, the deck 386 of vertical redirector base 380 may receive the flange fittings 300a and 300b, as shown in FIGS. 15D and 15E. An example of a vertical redirector base 380, according to the present disclosure, is shown in perspective in FIG. 15B. Vertical redirector base 380 includes a first end 382 and a second end 384, wherein the first end 382 and the second end 384 are spaced apart from each other, and the deck 386 connects the first end 382 and the second end 384. The first end 382 and the second end 384 contain a front surface, a back surface, and an outer end. The deck 386 contains a front surface, a back surface, and a pair of opposed tabs (388a, 388b) on the sides of the deck 386. The deck 386 is preferably curved as illustrated in FIG. 15B. An optional first transition 390 is defined by the intersection of the deck 386 and the first end 382, and a second transition 392 is defined by the intersection of the deck 386 and the second end 384. The first transition 390 serves as a transition portion between the deck 386 and the first end 382 that is offset from the deck 386. The offset at the first transition 390 between the deck 386 and the first end 382 provides a smooth transition and can receive a portion of the cable tray 40' placed adjacent the first end 382, reducing the probability of cable damage by providing a smooth transition between the connected cable tray 40' and vertical redirector base 380.

Likewise, an optional second transition 392 serves as a transition portion between the deck 386 and the second end 384 that is offset from the deck 386. The offset at the second transition 392 between deck 386 and second end 384 provides a smooth transition and can receive a portion of a cable tray 40 placed adjacent the second end 384, reducing the probability of cable damage by providing a smooth transition between the connected cable tray 40 and vertical redirector 378. A securing member 340 extends outwardly from both of the two opposed sides of the deck 386 of the first end 382 and the second end 384, as also illustrated in FIG. 15B.

Flange fitting 300a includes a curved portion 302a, a first end 304a and a second end 306a. First end 304a carries a first flange 308a with at least one hole 310a formed therein. Second end 306a carries a second flange 312a with at least one hole 314a formed therein. Holes 310a and 314a are provided for attaching flange fitting 300a onto the vertical redirector base 380, are preferably slotted holes to provide flexibility for connecting industrial components together.

The flange fitting 300a contains a tooth 330a extending outwardly from the curved portion 302a adjacent the first flange 308a. A recess 332a is disposed within the curved portion 302a, extending from the outer edge of the curved portion 302a and into the curved portion 302a between the tooth 330a and the first flange 308a and having a u-shape.

Flange fitting 300b includes a curved portion 302b, a first end 304b and a second end 306b. First end 304b carries a first flange 308b with at least one hole 310b formed therein. Second end 306b carries a second flange 312b with at least one hole 314b formed therein. Holes 310b and 314b are provided for attaching flange fitting 300b onto the vertical redirector base 380 are preferably slotted holes to provide flexibility for connecting industrial components together.

Flange fitting 300b contains a tooth 330b extending outwardly from the curved portion 302b adjacent the second flange 312b. A recess 332b is disposed within the curved portion 302b, extending from the outer edge of the curved portion 302b and into the curved portion 302b between the tooth 330b and the second flange 312b and having a u-shape.

Each tab (388a, 388b) of the deck 386 contains an outer edge 334 that extends to two opposed, spaced-apart shoulders 336. The shoulders 336 extend from an outer edge of the deck 386 to the outer edge 334 of the tab (388a, 388b) and on opposite ends of the deck 386. A first shoulder 336 is disposed adjacent the first end 382 and the second shoulder 336 is disposed adjacent the second end 384. As illustrated in FIG. 15B, the shoulders 336 extend from the outer edge of the deck 386 at a 90° angle outwardly from the outer edge of the deck 386. A corner 338 is formed at the intersection of the shoulders 336 and the outer edge of the deck 386. While the shoulders 336 are adjacent the first end 382 and the second end 384, respectively, the shoulders 336 are spaced apart from the first end 382, first transition 390, second end 384, and second transition 392, as illustrated in FIG. 15B. A securing member 340 extends outwardly from both of the two opposed sides of the first end 382 and the second end 384, as also illustrated in FIG. 15B.

FIGS. 15D and 15E show perspective views to illustrate moving flange fittings 300a and 300b into position onto deck 386 to form a vertical redirector 378 of the present disclosure. The front surface or receiving portion of the first end 382 is placed adjacent the back surface of a cable tray 40'. The front surface or receiving portion of the second end 384 is placed adjacent the back surface of a second cable tray 40. Flange fittings 300a and 300b are moved toward each side of the deck 386, with tab 388a centered so it can slide between the first flange 308a and the second flange 312a of flange fitting 300a, and tab 388b is centered so it can slide between the first flange 308b and second flange 312b of the second flange fitting 300b on the opposite side of the deck 386. As illustrated in FIG. 15D, tab 388a is positioned between the two teeth 330a on the first flange fitting 300a and the inner surface of the tab 388a contacts the bottom 316a of the curved portion 302a, wherein the tab 388a has the same radius of curvature as the bottom 316a of the curved portion 302a of flange fitting 300a. Tab 388b is positioned between the two teeth 330b on the second flange fitting 300b and the inner surface of the tab 388b contacts the bottom 316b of the curved portion 302b, wherein the tab 388b has the same radius of curvature as the bottom 316b of the curved portion 302b of the second flange fitting 300b.

The first flange 308b and second flange 312b of flange fitting 300b slide over deck 386 as the tab 388b slides over the bottom 316b of the flange fitting 300b and is positioned so that holes 394, 396, in deck 386 are aligned with at least one hole 310b in first flange 308b or at least one hole 314b in second flange 312b, respectively, of the flange fitting 300b. The first flange 308b and the second flange 312b of flange fitting 300b have a different configuration than the first flange 308a and the second flange 312a of flange fitting 300a. The first flange 308b and the second flange 312b of flange fitting 300b are offset, meaning the first flange 308b and the second flange 312b have an increased elevation with respect to the curved portion 302b compared to the elevation of first flange 308a and second flange 312a with respect to the curved portion 302a of flange fitting 300a. The first flange 312a and the second flange 312b have an increased elevation of one material thickness or the thickness of the first flange 308b and the second flange 312b compared to the first flange 308b and second flange 312b. This increased elevation allows the first flange 308b to slide overtop second flange 312a and second flange 312b to slide overtop first flange 308a, as illustrated in FIG. 15E. As first flange 308b slides overtop second flange 312a and second flange 312b slides overtop first flange 308a, the tab 388a slides over the bottom 316a of the flange fitting 300a and is positioned so that holes 394, 396, in first end 382 and second end 384, respectively, are aligned with at least one hole 310a in first flange 308a or at least one hole 314a in second flange 312a, respectively, of the flange fitting 300a. The teeth 330a and 330b press against respective securing members 340 establishing the inside width between flange fittings 300a and 300b. The recesses 332a and 332b provide clearances necessary for forming the flange fittings 300a and 300b and assembly of the vertical redirector 378. The flange fittings 300a and 300b do not extend beyond the first end 382 and the second end 384 of the vertical redirector base 380 or the outer edge of the receiving portion of the first end 382 or the second end 384.

In an alternate configuration, 300a and 300b are identical flanges. The positioning of the flanges, how they fit around deck 386, and how they assemble the vertical redirector 378 would be the same as described for those that are not identical.

FIG. 15E shows a completely assembled vertical redirector 378, according to this embodiment. All of the components: vertical redirector base 380, flange fittings 300a and 300b, four sets of fasteners (bolts 342 and nuts 344) comprise a vertical redirector kit for connecting two cable trays 40 and 40' (not included as part of the kit). The components within the kit may be housed within a container, such as a bag, box, bin, or the like for storage, shipment, and containing all components within the kit together until assembly and use.

Cables (not shown) may be placed onto vertical redirector 378 beginning at first cable tray 40, then across deck 386 and onto second cable tray 40'. First cable tray 40 and second cable tray 40' are secured to redirector base 380 using bolts 342 entering from the inside of first and second cable trays 40 and 40', respectively, and being fastened with nuts 344 from below the vertical redirector 378 as illustrated in FIGS. 15D and 15E.

Another exemplary vertical redirector base 480, according to the present disclosure, is shown in perspective in FIG. 16A. Vertical redirector base 480 includes a first end 482, a second end 484, wherein the first end 482 and the second end 484 are spaced apart from each other, a deck 486, connecting the first end 482 and the second end 484, and a pair of opposed tabs (488a, 488b). The first end 482 and the second end 484 contain a front surface, a back surface, and an outer end. The deck 486 contains a front surface, a back surface, and a pair of opposed tabs (488a, 488b) on the sides of the deck 486. The deck 486 is preferably curved as illustrated in FIG. 16A. Each tab (488a, 488b) contains an outer edge that extends to two opposed, spaced-apart shoulders 436. The shoulders 436 extend from an outer edge of the deck 486 to the outer edge of the tab (488a, 488b) and on opposite ends of the deck 486. A first shoulder 436 is disposed adjacent the first end 482 and the second shoulder 436 is disposed adjacent the second end 484. As illustrated in FIG. 16A, the shoulders 436 extend from the outer edge of the deck 486 at a 90° angle outwardly from the outer edge of the deck 486. A corner 438 is formed at the intersection of the shoulders 436 and the outer edge of the deck 486. At least one hook 500 is disposed on tab 488a, extending outwardly from the tab 488a. The hook 500 contains a base portion that extends outwardly from the deck 486, extending outwardly from the tab 488a of the deck 486, and a perpendicularly extending elongate portion from the base that is spaced-apart from the deck 486 and tab 488a, creating a void between the elongate portion and the deck 486 and tab 488a. As illustrated in FIG. 16A, two hooks 500 are disposed on tab 488a.

Likewise, at least one hook 502 is disposed on tab 488b, extending outwardly from the tab 488b. The hook 502 contains a base portion that extends outwardly from the deck 486, extending outwardly from the tab 488b of the deck 486, and a perpendicularly extending elongate portion from the base that is spaced-apart from the deck 486 and tab 488b, creating a void between the elongate portion and the deck 486 and tab 488b. As illustrated in FIG. 16A, two hooks 502 are disposed on tab 488b, wherein the hooks 502 face in an opposite direction than the hooks 500. In other words, the elongate portion of the hooks 502 extends perpendicularly outwardly in the opposite direction than the elongate portion of the hooks 500. As illustrated in FIG. 16A, the elongate portion of the hooks 500 extend perpendicularly outward towards the first end 482 of the deck, while the elongate portion of the hooks 502 extend perpendicularly outward towards the second end 484 of the deck 486. Hooks 500 and 502 assist in the alignment of the redirector components and secure the final assembly. Hooks 500 and 502 and deck 486 are each curved at the same radius for a matched fit at assembly. Larger redirectors with larger radius bend may require additional hooks. While two hooks (500, 502) are illustrated on each tab (488a, 488b) of the deck 486, the base 480 may include two or more hooks (500, 502) on each tab (488a, 488b) or may contain a plurality of hooks (500,502) on each tab (488a,488b).

The deck 486 of vertical redirector base 480 of FIG. 16A may receive two curved flange fittings 400 having a structure illustrated in FIG. 16B. Flange fitting 400 includes a curved portion 402 with a bottom 416, a first end 404, and a second end 406. First end 404 carries a first flange 408 with at least one hole 410 formed therein. Second end 406 carries a second flange 412 with at least one hole 414 formed therein. Holes 410, 414 that are provided for attaching flange fitting 400 are preferably slotted holes to provide flexibility for connecting industrial components together. At least one slot 504 is disposed within the curved portion 402 of the flange fitting 400 and preferably positioned in close proximity to the bottom 416 of the curved portion 402. As illustrated in FIG. 16B, the flange fitting 400 contains two spaced-apart slots disposed within the curved portion 402 of the flange fitting 400 in close proximity to the bottom 416 of the curved portion 402. Slots 504 and deck 486 are each curved at the same radius for a matched fit at assembly. Larger redirectors with a larger radius bend may require additional slots. The flange fitting 400 may contain one slot 504, two or more slots 504, or a plurality of slots 504. The number of slots 504 preferably corresponds to the number of hooks 500. A recess 432 is disposed within the curved portion 402. The flange fitting 400 facilitates a cable redirection of about 90 degrees, for the sake of the present example. Those of ordinary skill will readily recognize that other angles for redirection are readily obtainable.

FIG. 16C shows a perspective view to illustrate moving flange fittings 400 and 400' into position onto deck 486 to form a vertical redirector 478 of the present disclosure. Flange fittings 400 and 400' are moved toward each side of the deck 486, wherein each slot 504 is centered with a hook 500 so the slot 504 can slide over the hook 500, resulting in the elongate portion of the hook 500 sliding through the slot 504 and positioned on the outer side of the flange fitting 400 with a portion of the slot 504 positioned within the void of the hook 500. Hooks 500 and 502, deck 486, and slots 504 and 504' are each curved at the same radius for a matched fit at assembly. The flange fitting 400 is slid in the direction opposite the direction the elongate portion of the hook 500 extending until an end of the slot 504 contacts the base of the hook 500, preventing further movement of the flange fitting 400, creating a stable and secure connection between the flange fitting 400 and vertical redirector base 480. Similarly, slot 504' is centered with a hook 502 so the slot 504' can slide over the hook 502, resulting in the elongate portion of the hook 502 sliding through the slot 504' and positioned on the outer side of the flange fitting 400' with a portion of the slot 504' positioned within the void of the hook 502. The flange fitting 400' is slid in the direction opposite the direction the elongate portion of the hook 502 extending until an end of the slot 504' contacts the base of the hook 502, preventing further movement of the flange fitting 400', creating a stable and secure connection between the flange fitting 400' and vertical redirector base 480. The flange fitting 400' may contain one slot 504', two or more slots 504', or a plurality of slots 504'. The number of slots 504' preferably corresponds to the number of hooks 504'.

First flange 408 and second flange 412 slide under deck 486 as slots 504 slide over hooks 500 of the flange fitting 400. The flange fitting 400 is positioned so that holes 494, 496, in first end 482 and second end 484, respectively, are aligned with at least one hole 410 in first flange 408 or at least one hole 414 in second flange 412, respectively, of flange fitting 400. Similarly, first flange 408' and second flange 412' of the second flange fitting 400' slide under deck 486 as slots 504' of the flange fitting 400' slide over hooks 502. The flange fitting 400' is positioned so that holes 494, 496, in first end 482 and second end 484, respectively are aligned with at least one hole 414' in first flange 412' or at least one hole 410' in second flange 408', respectively, of the second flange fitting 400'.

FIG. 16D shows a completely assembled vertical redirector 478. All of the components: vertical redirector base 480, flange fittings 400 and 400', eight sets of fasteners (bolts 442 and nuts 444) comprise a vertical redirector kit for connecting two cable trays 36 and 36' (not included as part of the kit). The components within the kit may be housed within a container, such as a bag, box, bin, or the like for storage, shipment, and containing all components within the kit together until assembly and use.

It should be noted that in FIG. 16C, a total of eight bolts 442 and nuts 444 are needed to hold two cable trays 36, 36' within the non-welded cable tray redirector. FIG. 16D shows the same number, eight bolts 442 and nuts 444 used to hold two cable trays 36, 36' to the vertical redirector 478 without any welding needed to complete the vertical redirector components or assembly. The cost and time to weld cable tray redirectors has been completely avoided. Cables (not shown) may be placed onto vertical redirector 478 beginning at first cable tray 36, then across deck 486 and onto second cable tray 36'. First cable tray 36 and second cable tray 36' are secured to redirector base 480 using bolts 442 entering from the inside of first and second cable trays 36 and 36', respectively, and being fastened with nuts 444 from below the vertical redirector 478.

Connecting fasteners may be provided together with cable tray redirectors or in certain situations may be provided by others according to customer's requirements. Connecting fasteners with low profile heads provide greater capacity inside the tray system. Additional fasteners may be provided for tray runs for mounting or installing the cable tray run or to connect other components to the cable tray run.

Connecting fasteners are preferably bolts and other "tightenable" fasteners, because they are generally better able to maintain the electrical continuity needed to meet industrial electrical codes and regulations.

If bolts are used for assembling tray redirectors and the tray system, nuts, locking nuts, or flanged locking nuts may be used with or without washers, to create contact pressure and contact surface area, between the redirector and the tray surfaces for electrical continuity, which may be useful to meet industrial electrical codes and regulations.

The fasteners that are used to assemble a cable tray redirector, according to the present disclosure, may be the same fasteners that connect cable tray ends to the cable tray redirector.

Where redirecting connectors have larger bend radii or longer wall lengths the curved or straight diagonal flange fittings may be reinforced with ribs, fasteners, brackets or the like for rigidity of the curved or diagonal flange within the overall assembly.

The elimination of welding, heating or stressing metal in cable tray components reduces cost and increases product desirability for use in safety-related products or products used by the nuclear industry or facilities where there are seismic restrictions.

Since many cable trays have multiple rows of parallel holes and most cable redirectors connect two tray sections, the quantities of horizontal 90° curved flange fittings that require offset or staggered flanges is normally relatively small. Therefore, curved flange or diagonal straight flange fittings are generally identical throughout the redirectors of a cable tray run where the cable tray is of the same size and configuration and the degree and radius of redirections does not vary. Where more than two intersecting, narrow cable tray sections having a single row of holes for connecting a tray to redirectors intersect, a combination of higher and lower flanges can be used to construct a "T" or cross redirector.

What is claimed is:

1. A vertical redirector for use with at least two cable trays, comprising:
   (a) a vertical redirector base having a first end and a second end spaced-apart from each other, a deck connecting the first end and the second end, wherein the first end contains a first receiving portion and the second end contains a second receiving portion, the deck contains a first side and an opposed second side with a first tab extending from the first side of the deck and a second tab extending from the second side of the deck;
   (b) a first flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a curved portion extending between the first end and the second end of the first flange fitting; and
   (c) a second flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a curved portion extending between the first end and the second end of the second flange fitting.

2. The vertical redirector of claim 1, further comprising at least one fastener securing the first flange fitting and the second flange fitting to the vertical redirector base.

3. The vertical redirector of claim 1, wherein the curved portion of the flange fitting is c-shaped.

4. The vertical redirector of claim 1, wherein the curved portion of the flange fitting is flat.

5. The vertical redirector of claim 1, wherein the first flange of the first flange fitting and the second flange fitting is joined to the first receiving portion of the vertical redirector base and the second flange of the first flange fitting and the second flange fitting is joined to the second receiving portion of the vertical redirector base.

6. The vertical redirector of claim 1, wherein the first end of the first flange fitting and the first end of the second flange fitting do not extend beyond the end of the first end of the vertical redirector base.

7. The vertical redirector of claim 1, wherein the vertical redirector base is configured to nest with a second vertical redirector base.

8. The vertical redirector of claim 1, wherein the flange fitting is configured to nest with another flange fitting.

9. A vertical redirector for use with at least two cable trays, comprising:
(a) a vertical redirector base having a first end and a second end spaced-apart from each other, a deck connecting the first end and the second end, wherein the first end contains a first receiving portion and the second end contains a second receiving portion, the deck contains a first side and an opposed second side with a first tab extending from the first side of the deck and a second tab extending from the second side of the deck, a first notch is disposed within the first tab and a second notch is disposed within the second tab;
(b) a first flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a curved portion extending between the first end and the second end of the first flange fitting; and
(c) a second flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a curved portion extending between the first end and the second end of the second flange fitting.

10. The vertical redirector of claim 9, further comprising at least one fastener securing the first flange fitting and the second flange fitting to the vertical redirector base.

11. The vertical redirector of claim 9, wherein the curved portion of the flange fitting is c-shaped.

12. The vertical redirector of claim 9, wherein the curved portion of the flange fitting is flat.

13. The vertical redirector of claim 9, wherein the first flange of the first flange fitting and the second flange fitting is joined to the first receiving portion of the vertical redirector base and the second flange of the first flange fitting and the second flange fitting is joined to the second receiving portion of the vertical redirector base.

14. The vertical redirector of claim 9, wherein the first end of the first flange fitting and the first end of the second flange fitting do not extend beyond the end of the first end of the vertical redirector base.

15. The vertical redirector of claim 9, wherein the vertical redirector base is configured to nest with a second vertical redirector base.

16. The vertical redirector of claim 9, wherein the flange fitting is configured to nest with another flange fitting.

17. A vertical redirector for use with at least two cable trays, comprising:
(a) a vertical redirector base having a first end and a second end spaced-apart from each other, a deck connecting the first end and the second end, wherein the first end contains a first receiving portion and the second end contains a second receiving portion, the deck contains a first side and an opposed second side with a first tab extending from the first side of the deck and a second tab extending from the second side of the deck, a first notch is disposed within the first tab and a second notch is disposed within the second tab;
(b) a first flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a central portion extending between the first end and the second end of the first flange fitting and disposed between the first flange and the second flange containing at least one hole; and
(c) a second flange fitting having a first end and a second end, the first end carries a first flange with at least one hole formed in the first flange being registrable with at least one hole formed on the first receiving portion, the second end carries a second flange with at least one hole formed in the second flange being registrable with at least one hole formed on the second receiving portion, a central portion extending between the first end and the second end of the second flange fitting and disposed between the first flange and the second flange containing at least one hole.

18. The vertical redirector of claim 17, further comprising a support member containing a first externally threaded end that is received within the hole of the central portion of the first flange fitting and a second externally threaded end that is received within the hole of the central portion of the second flange fitting.

19. The vertical redirector of claim 17, wherein the first flange fitting does not extend beyond an outer edge of the receiving portion of the first end or the second end of the vertical redirector base and the second flange fitting does not extend beyond the outer edge of the receiving portion of the first end or the second end of the vertical redirector base.

20. The vertical redirector of claim 17, wherein the first flange fitting is configured to nest with the second flange fitting.

* * * * *